United States Patent [19]
Ueda et al.

[11] Patent Number: 5,680,254
[45] Date of Patent: Oct. 21, 1997

[54] LENS FOR READING AN ORIGINAL IMAGE

[75] Inventors: Takeshi Ueda, Tokyo; Naoki Miyatake, Yokohama; Kiichiro Nishina, Yokohama; Takao Yamaguchi, Yokohama; Noriyuki Iwata, Fujisawa, all of Japan

[73] Assignee: Ricoh Company, Ltd., Tokyo, Japan

[21] Appl. No.: 309,477

[22] Filed: Sep. 21, 1994

[30] Foreign Application Priority Data

| Sep. 22, 1993 | [JP] | Japan | 5-236464 |
| Mar. 3, 1994 | [JP] | Japan | 6-033629 |
| May 23, 1994 | [JP] | Japan | 6-108579 |

[51] Int. Cl.$^6$ ............................................ G02B 3/00
[52] U.S. Cl. ............................................ 359/652
[58] Field of Search ............................ 359/652, 653, 359/654

[56] References Cited

U.S. PATENT DOCUMENTS

| 4,859,040 | 8/1989 | Kitagishi et al. | 359/652 |
| 4,998,807 | 3/1991 | Uzawa et al. | 359/654 |
| 5,011,272 | 4/1991 | Nakayama et al. | 359/653 |
| 5,054,898 | 10/1991 | Kitagishi et al. | 359/654 |
| 5,268,791 | 12/1993 | Tsuchida | 359/654 |

FOREIGN PATENT DOCUMENTS

| 4-263211 | 9/1992 | Japan |
| 4-338908 | 11/1992 | Japan |

Primary Examiner—Georgia Y. Epps
Assistant Examiner—Dawn-Marie Bey
Attorney, Agent, or Firm—Oblon, Spivak, McClelland, Maier & Neustadt, P.C.

[57] ABSTRACT

A lens for reading an original has first to third lens groups sequentially arranged from an object side toward an image side. The first lens group is constructed by a first lens as a positive meniscus lens having a convex face on the object side. The second lens group is constructed by a second lens as a biconcave lens. The third lens group is constructed by a third lens as a biconvex lens. The first lens is constructed by a refractive index distribution type lens having a refractive index changed in a direction perpendicular to an optical axis of the original reading lens. Each of the second and third lenses is constructed by a refractive index distribution type lens having a refractive index changed in a direction of the optical axis. Otherwise, at least one of the first, second and third lenses may be constructed by a refractive index distribution type lens. In this lens construction, the original reading lens can be made compact and a field angle of this lens can be easily widened and high performance of the original reading lens can be easily realized.

3 Claims, 38 Drawing Sheets

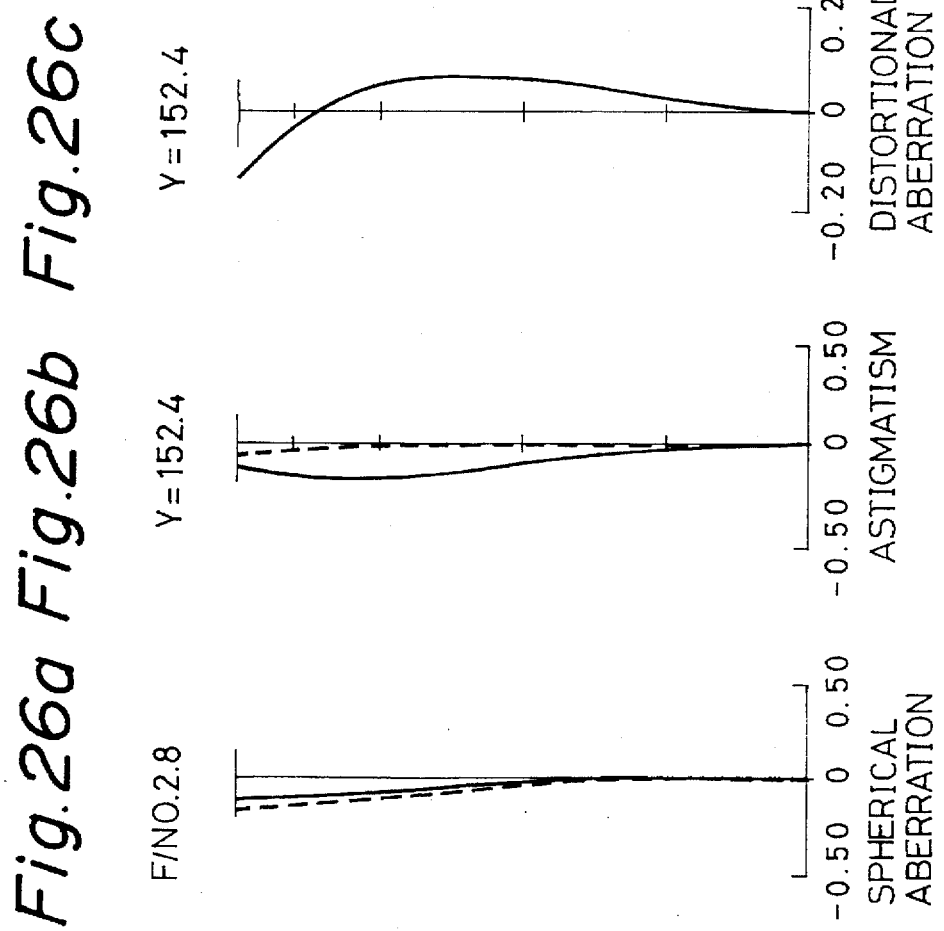

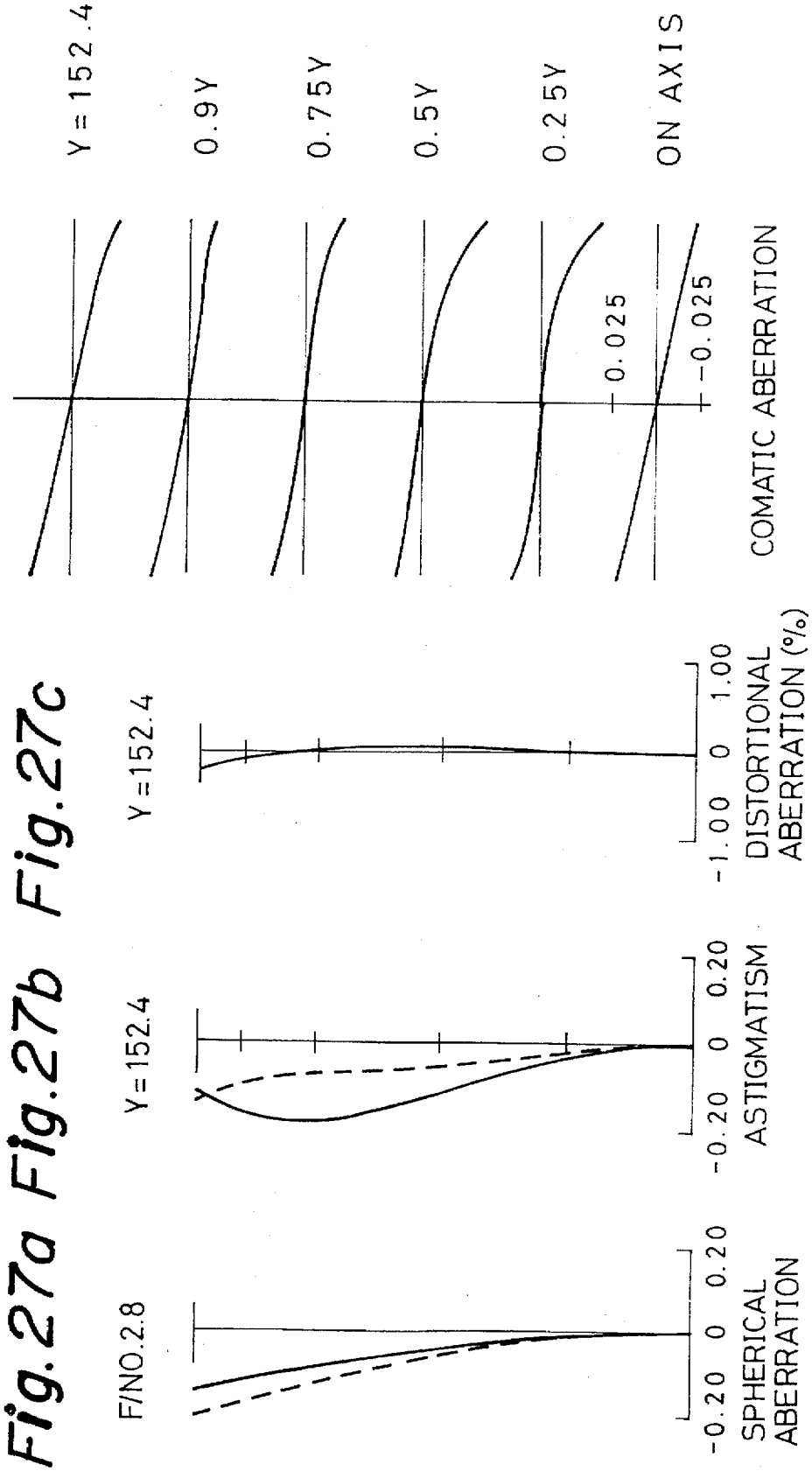

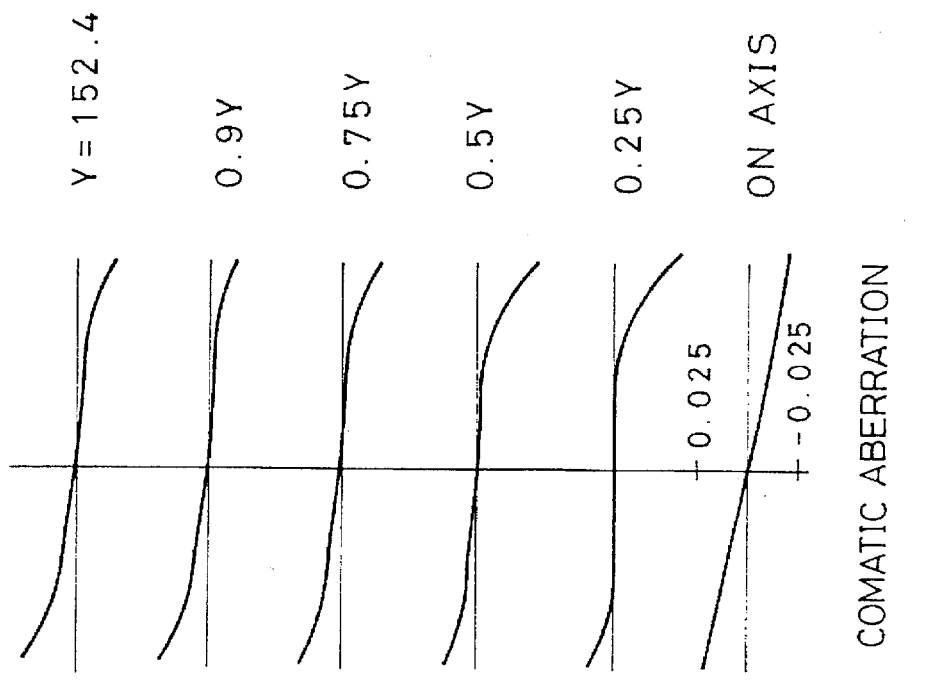
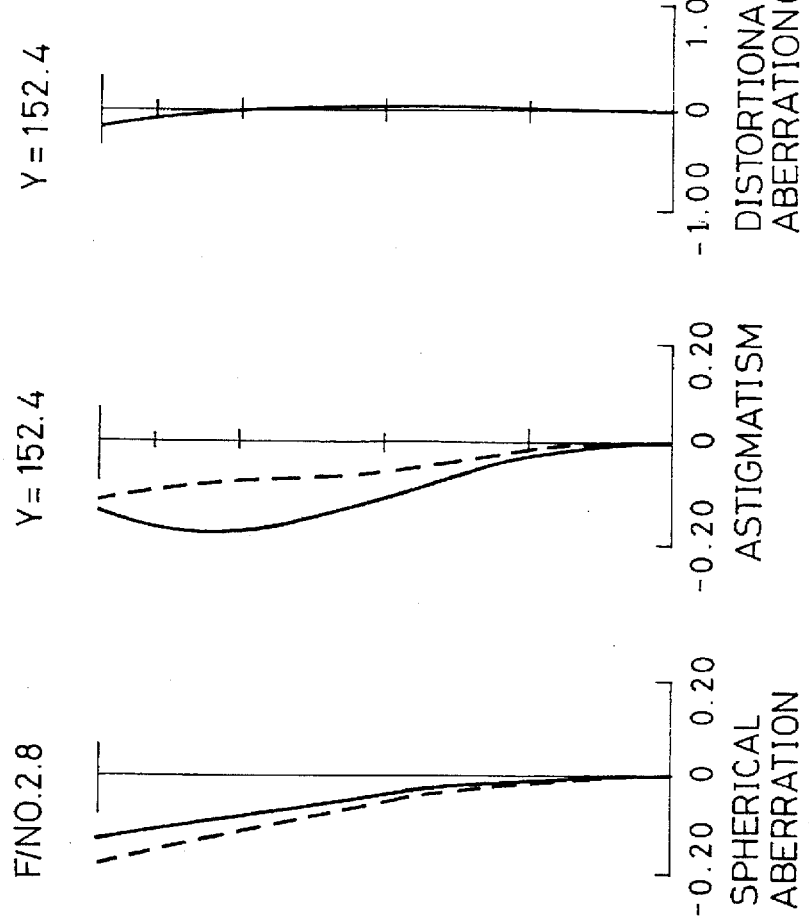

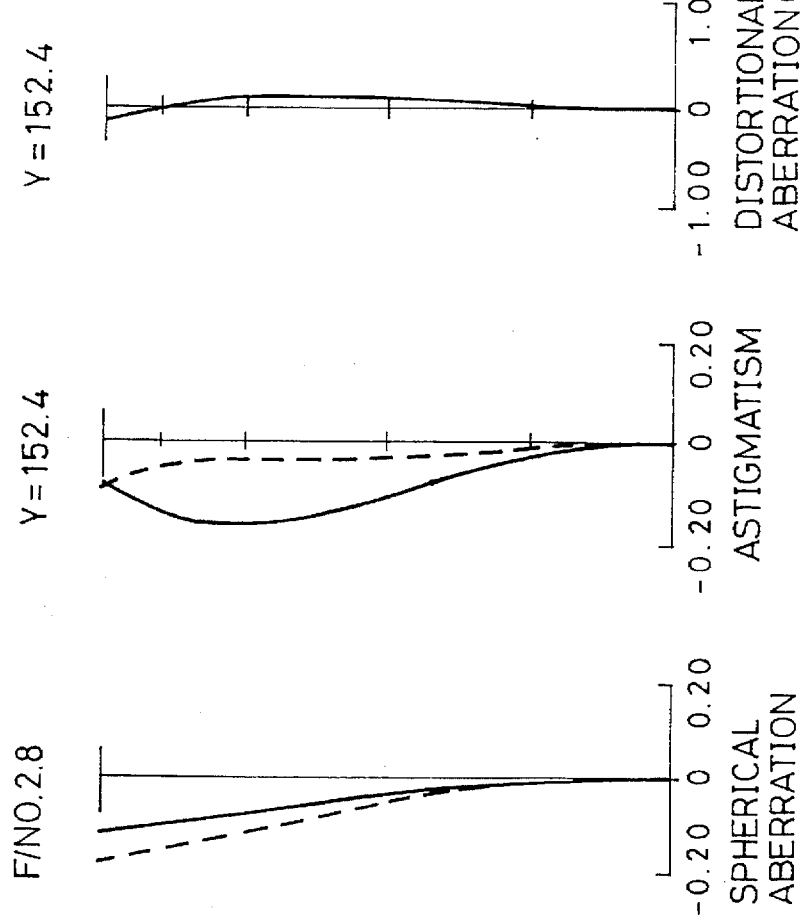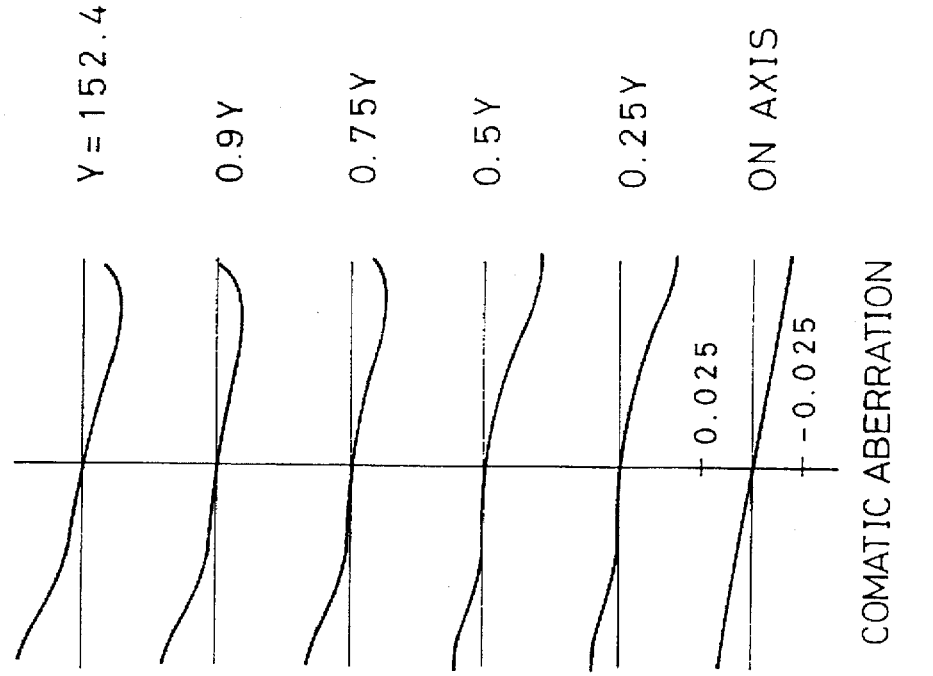

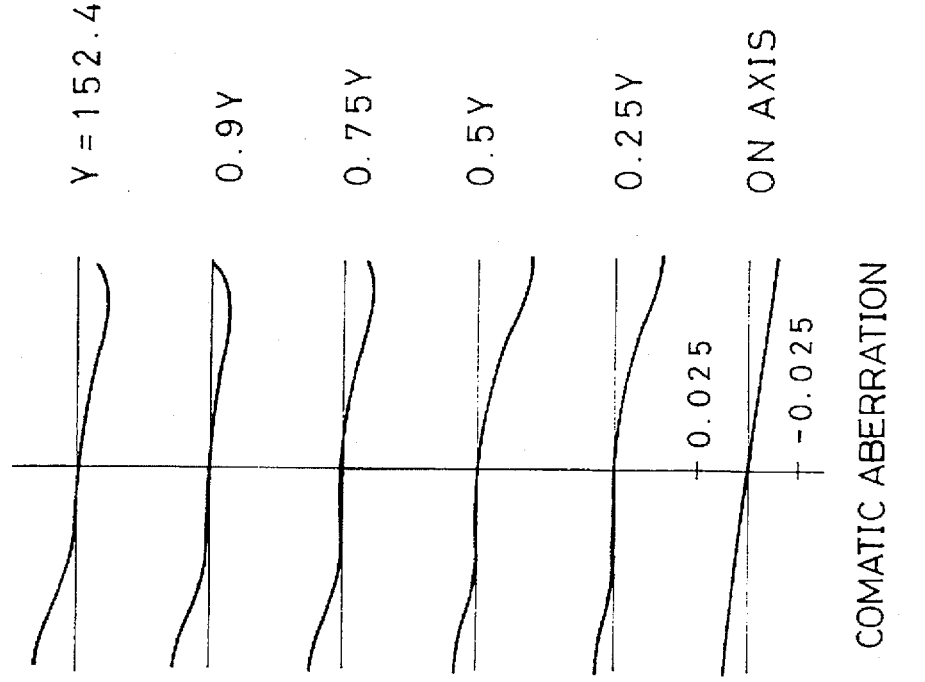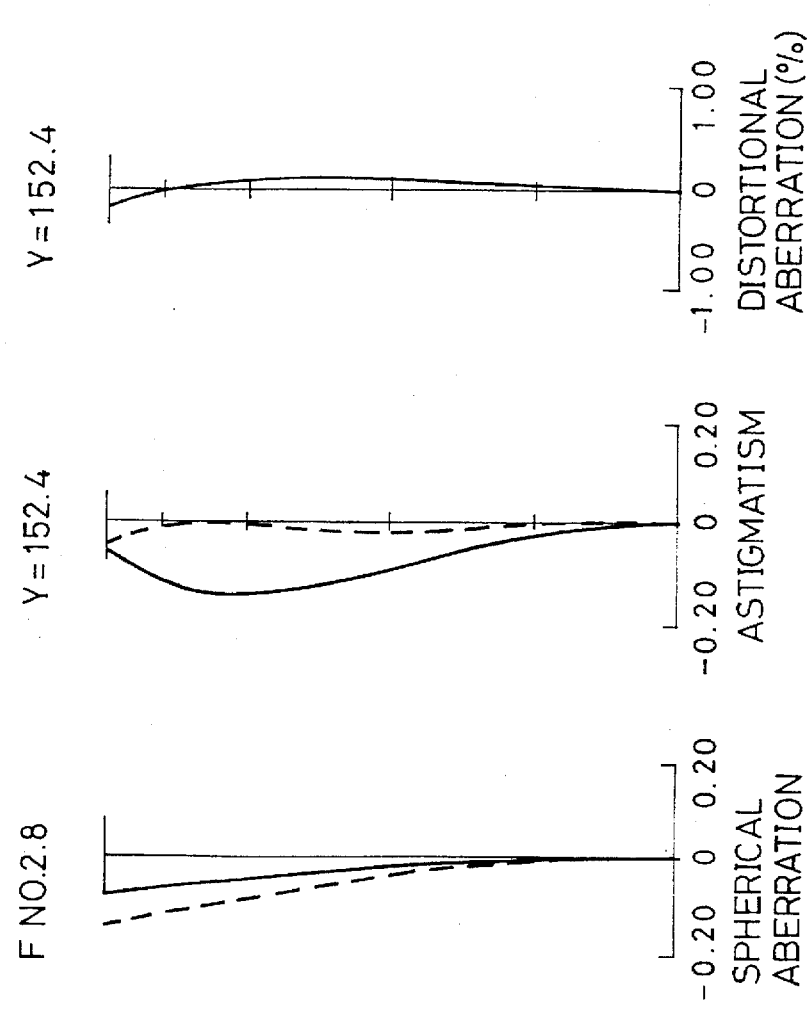

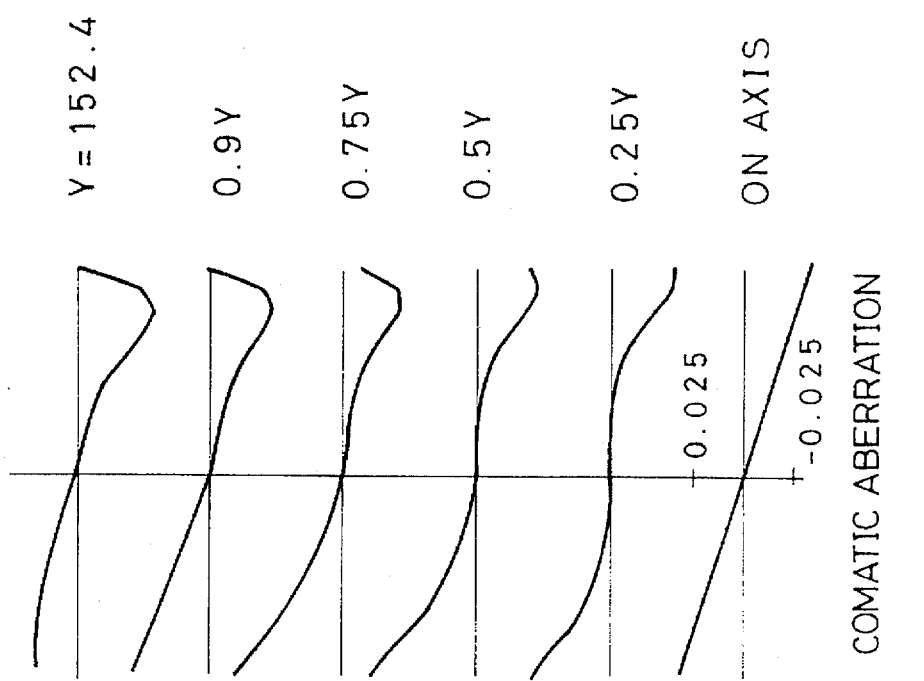
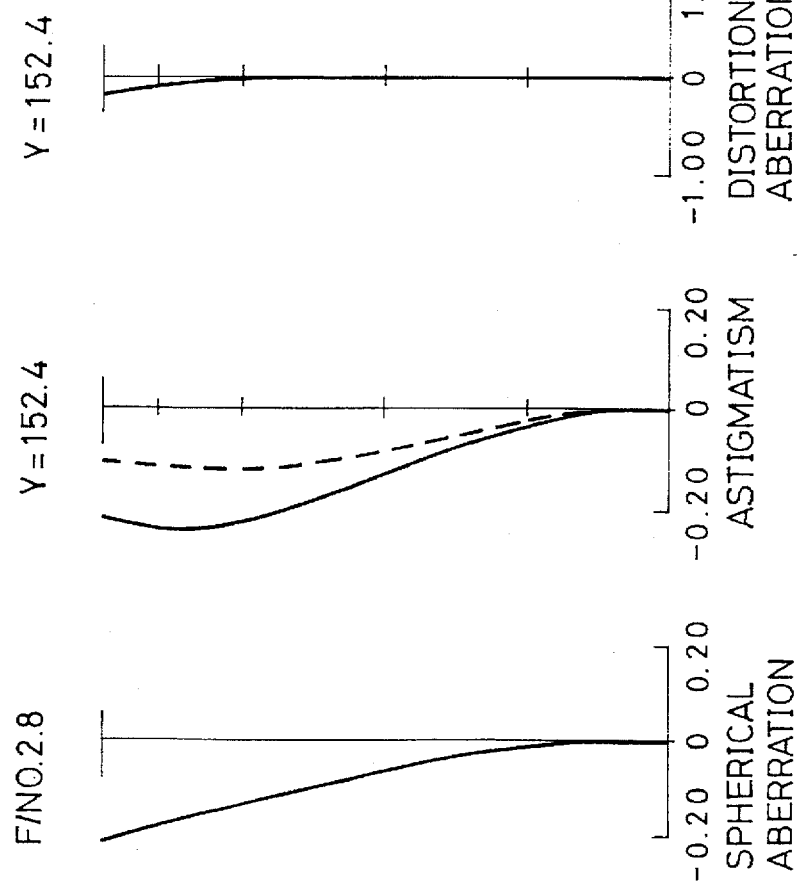

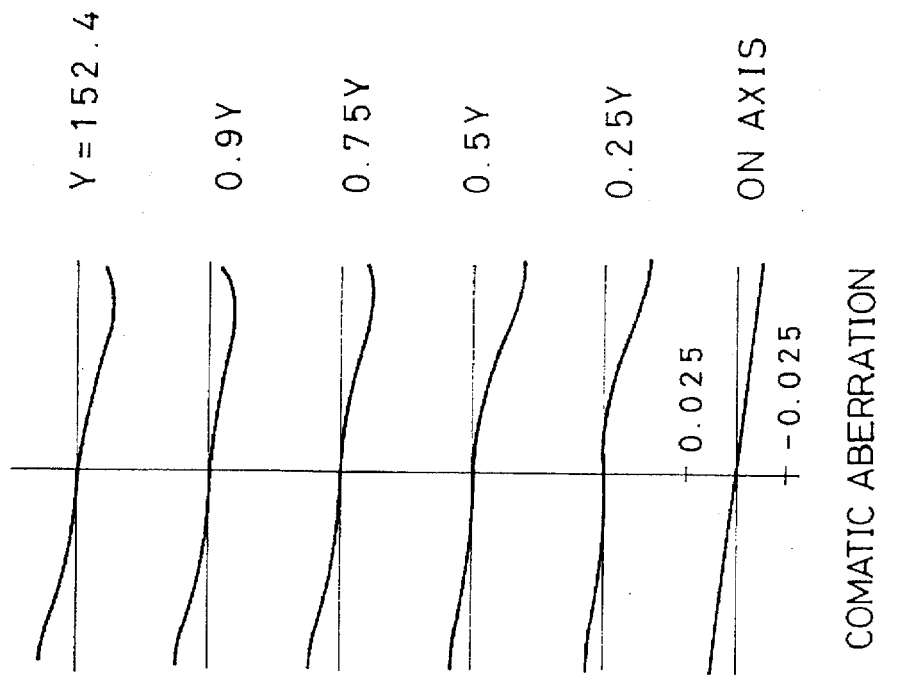
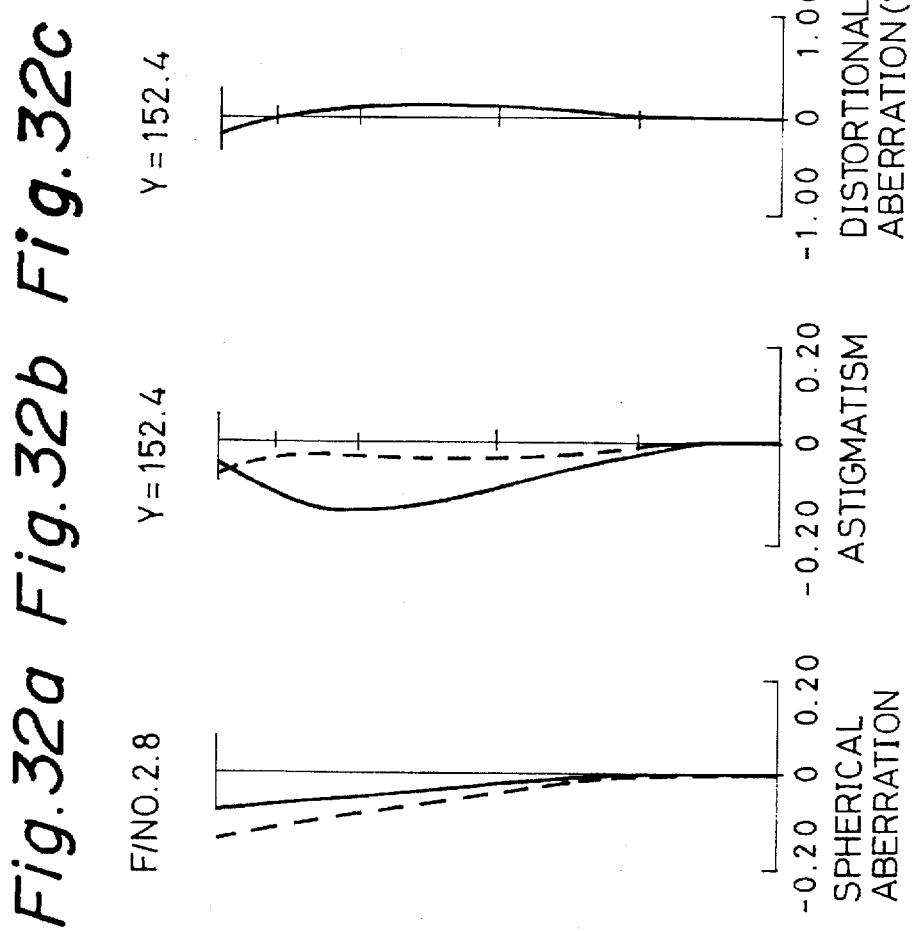

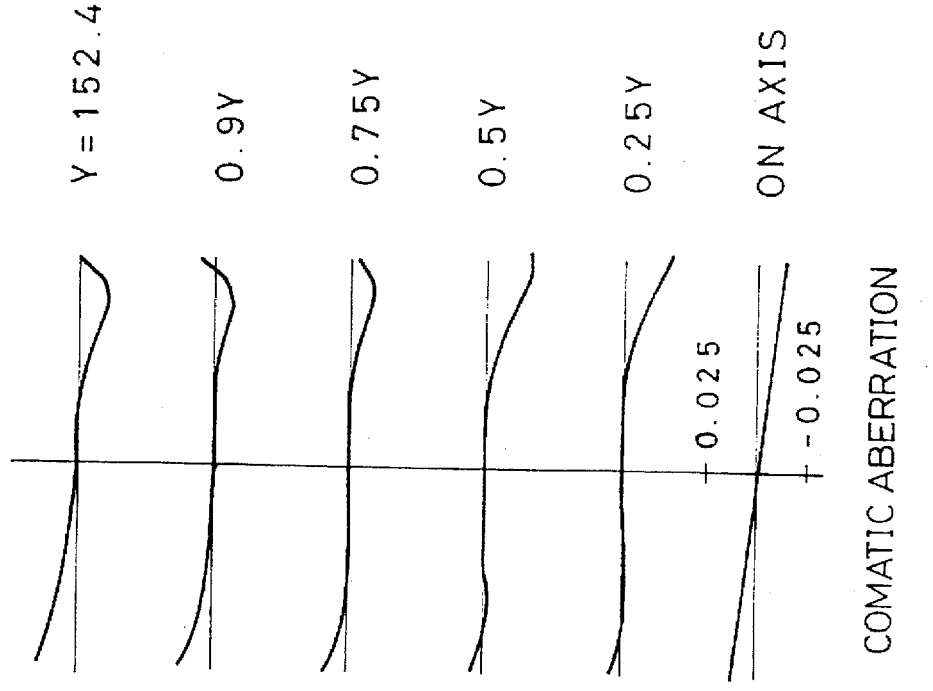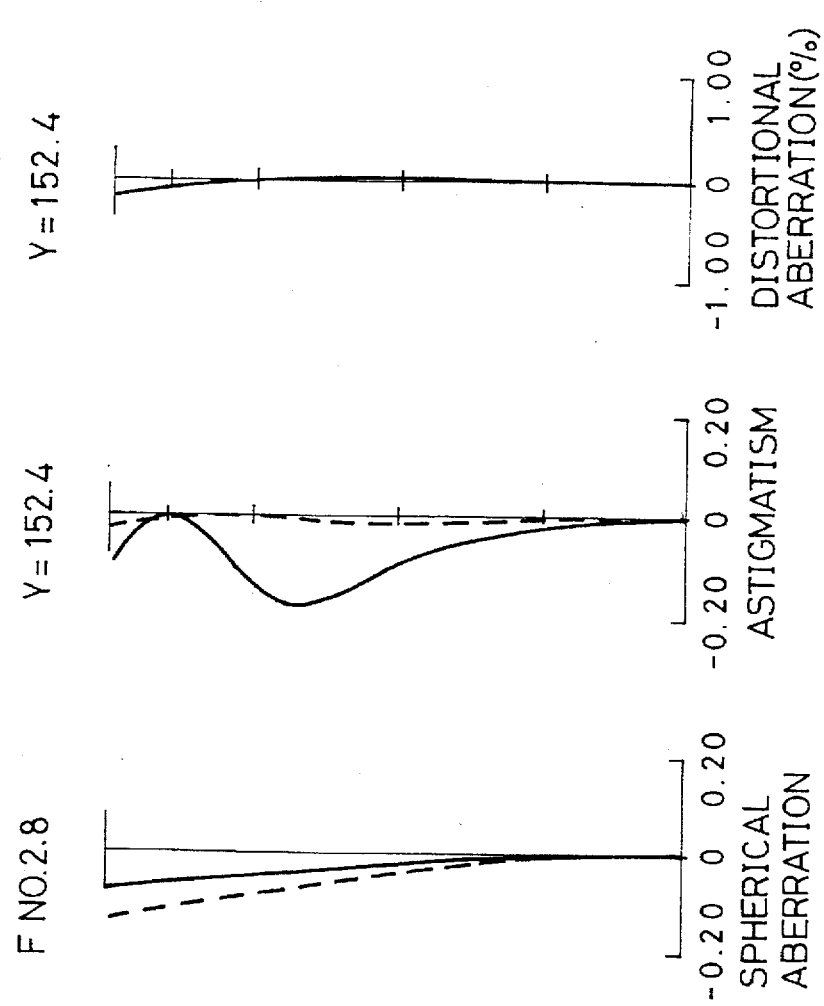

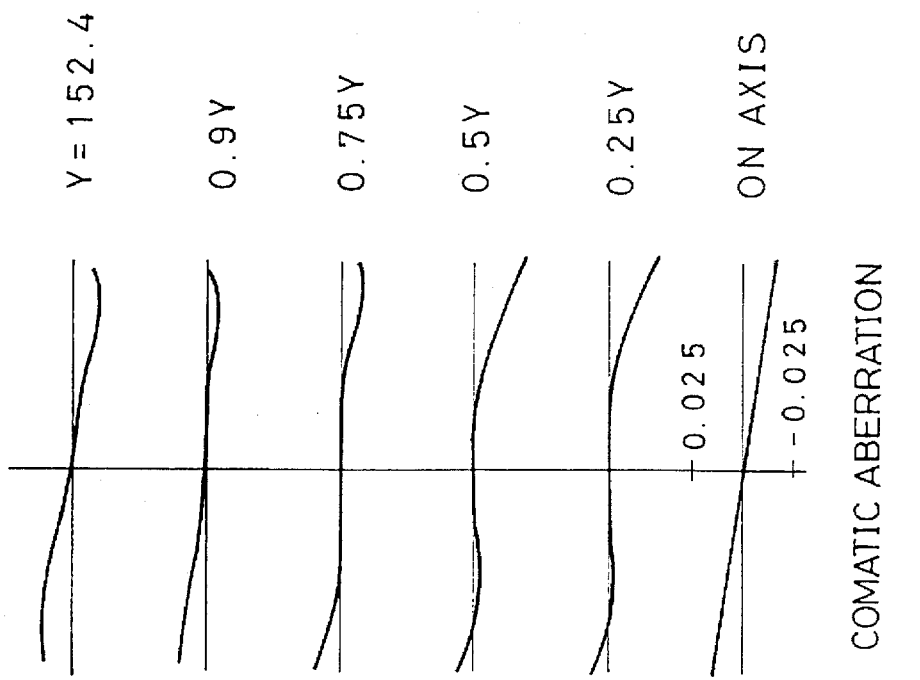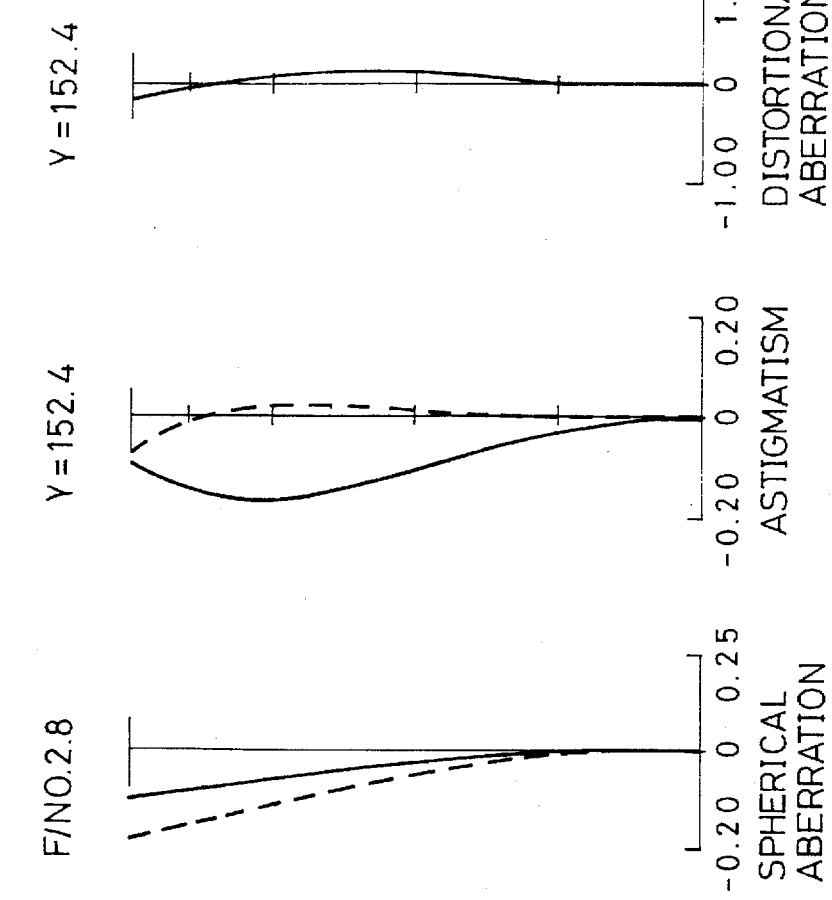

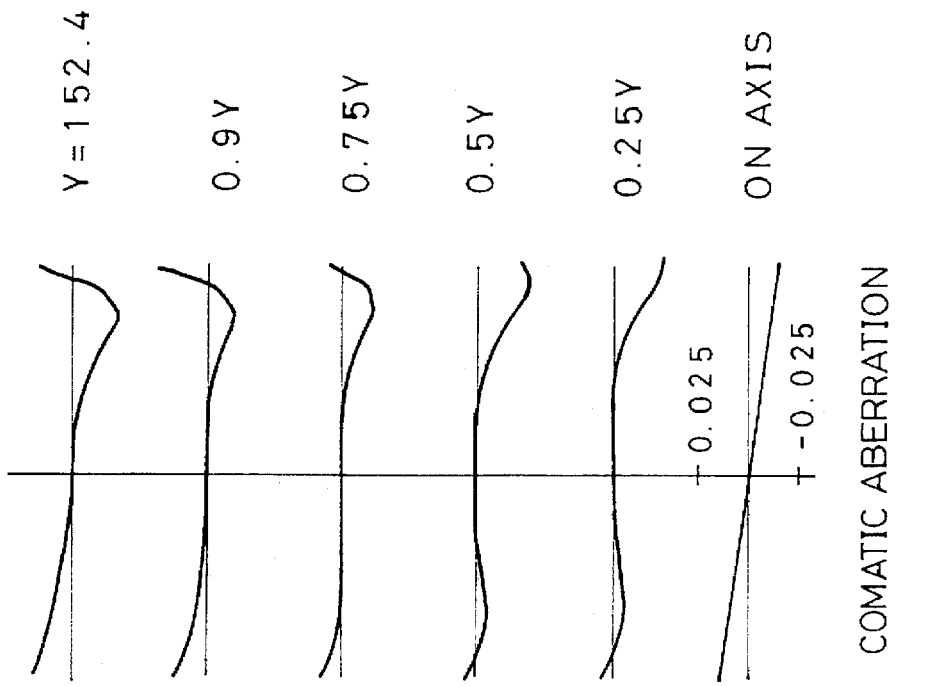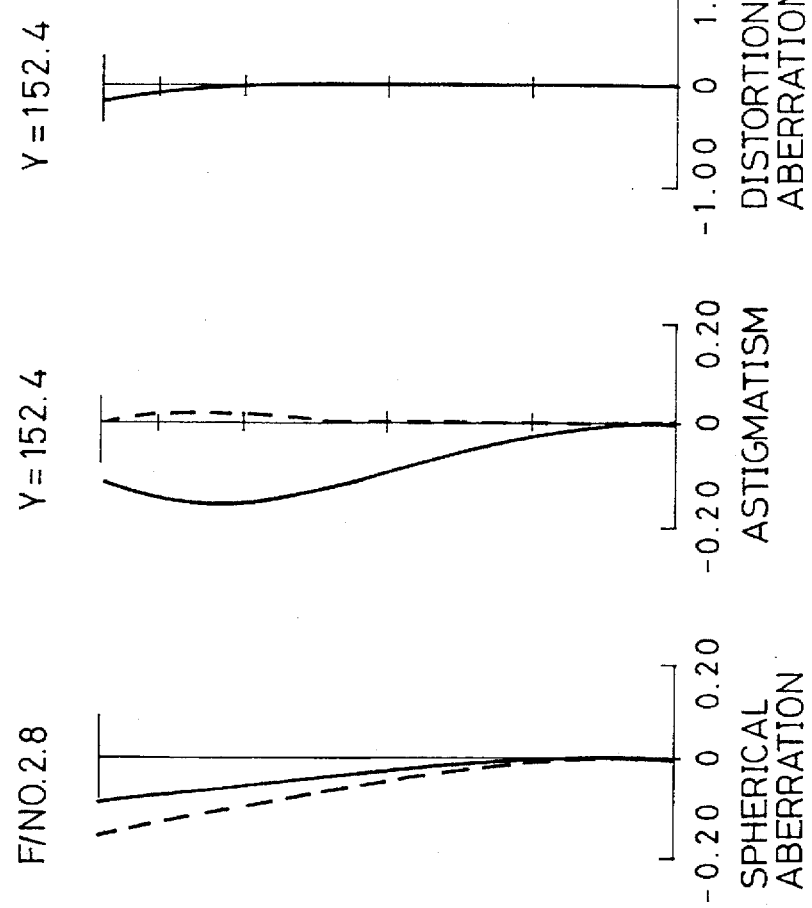

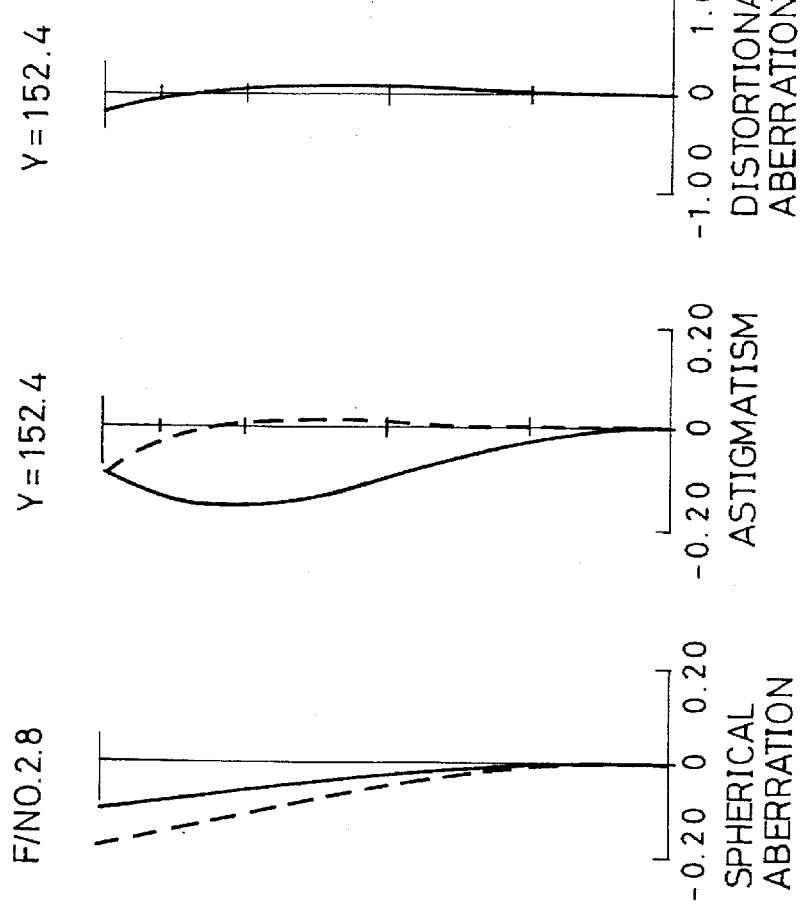

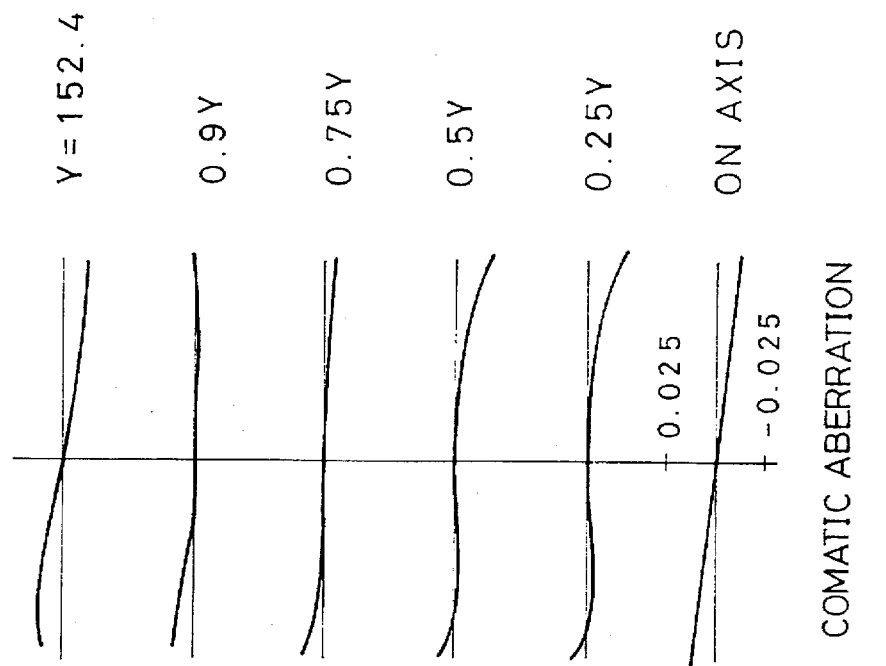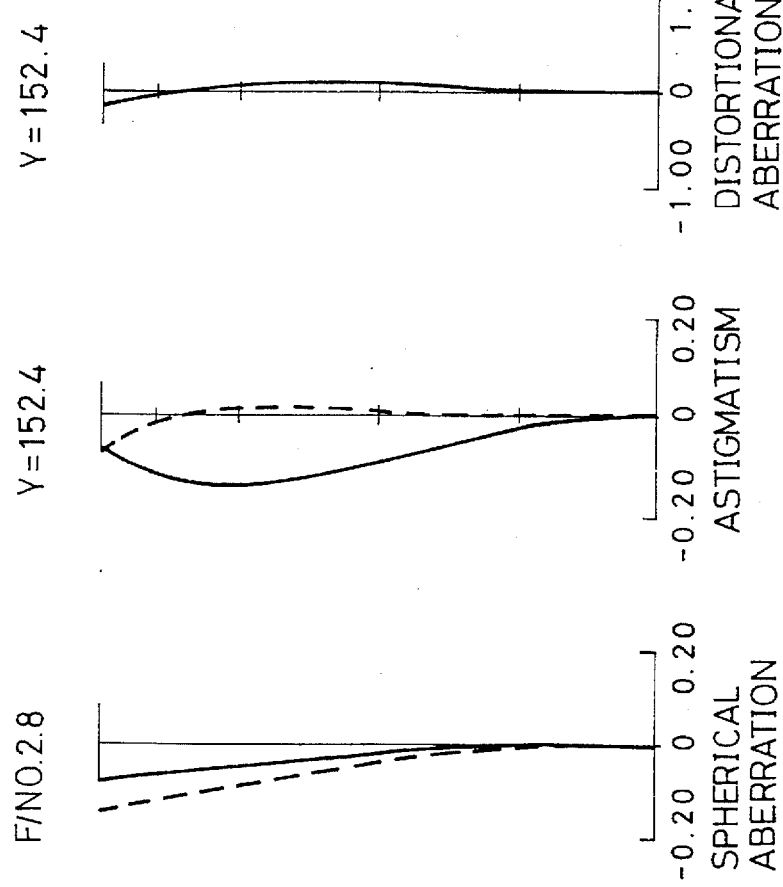
Fig.38a Fig.38b Fig.38c Fig.38d

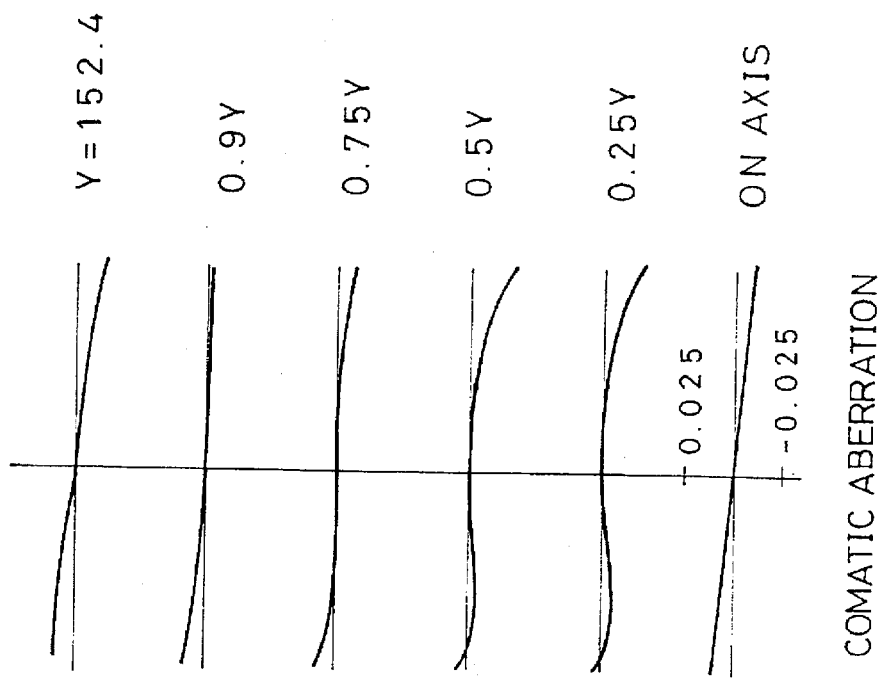
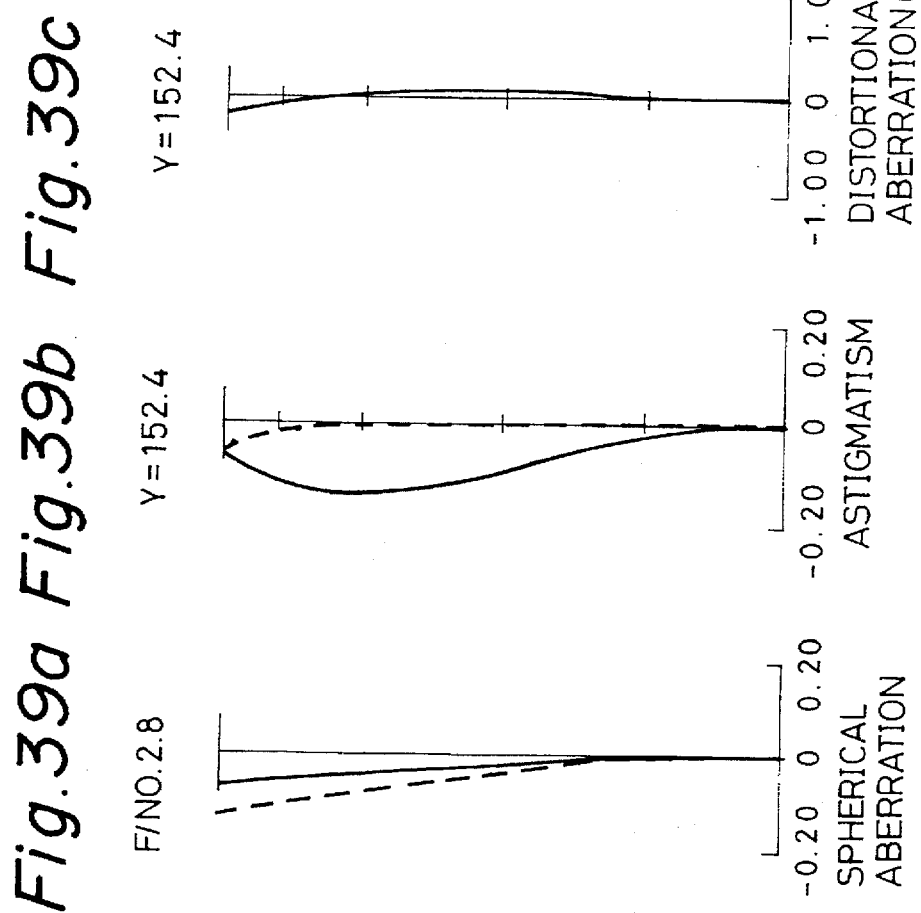
Fig.39a  Fig.39b  Fig.39c  Fig.39d

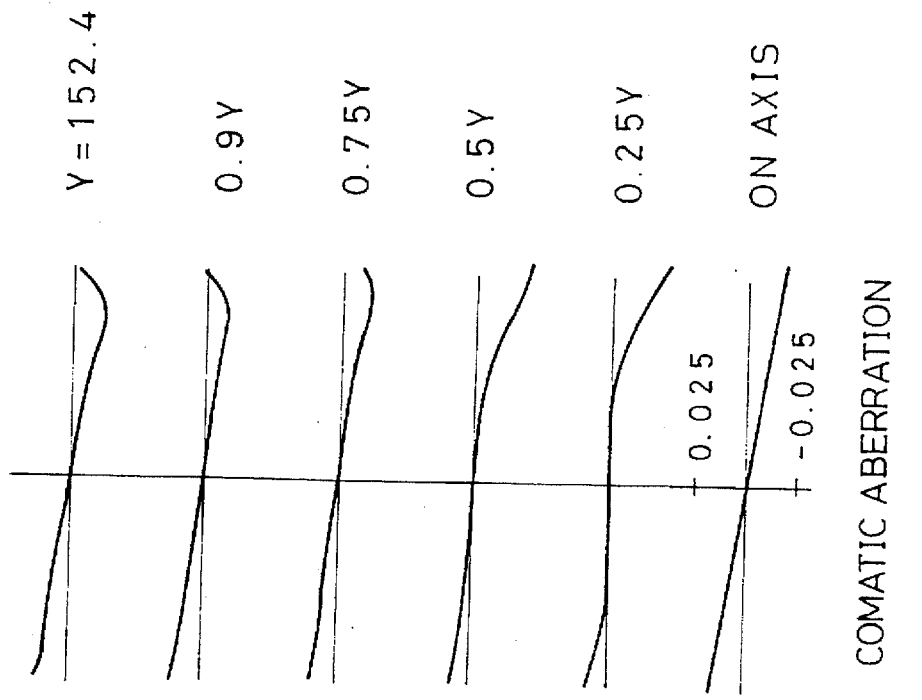
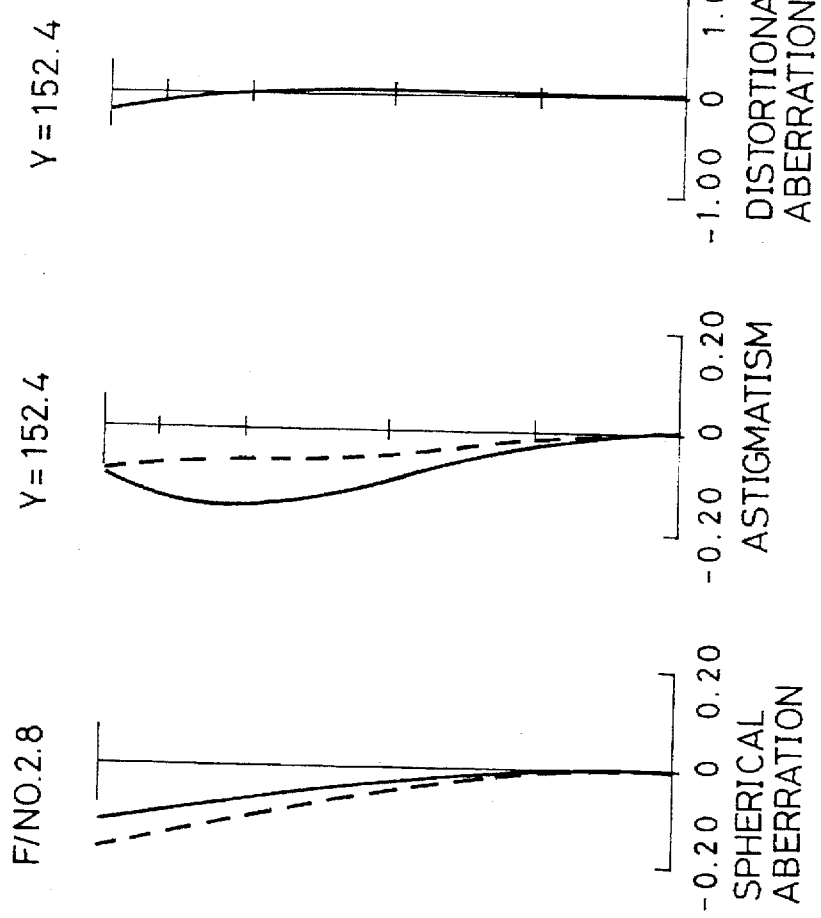

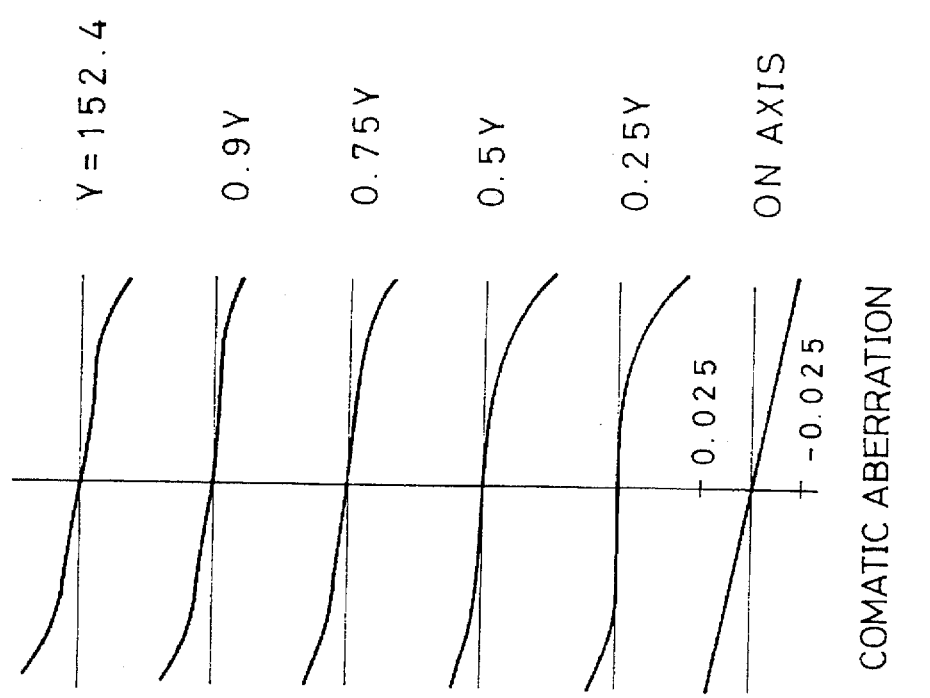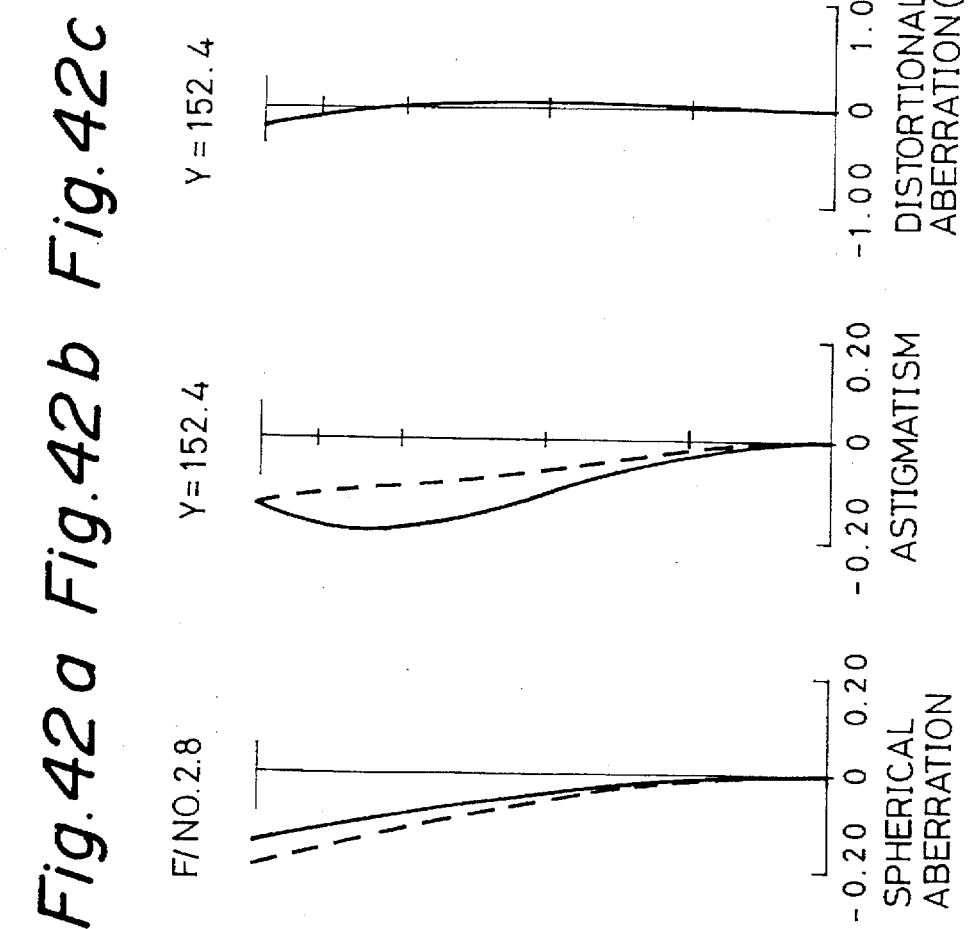

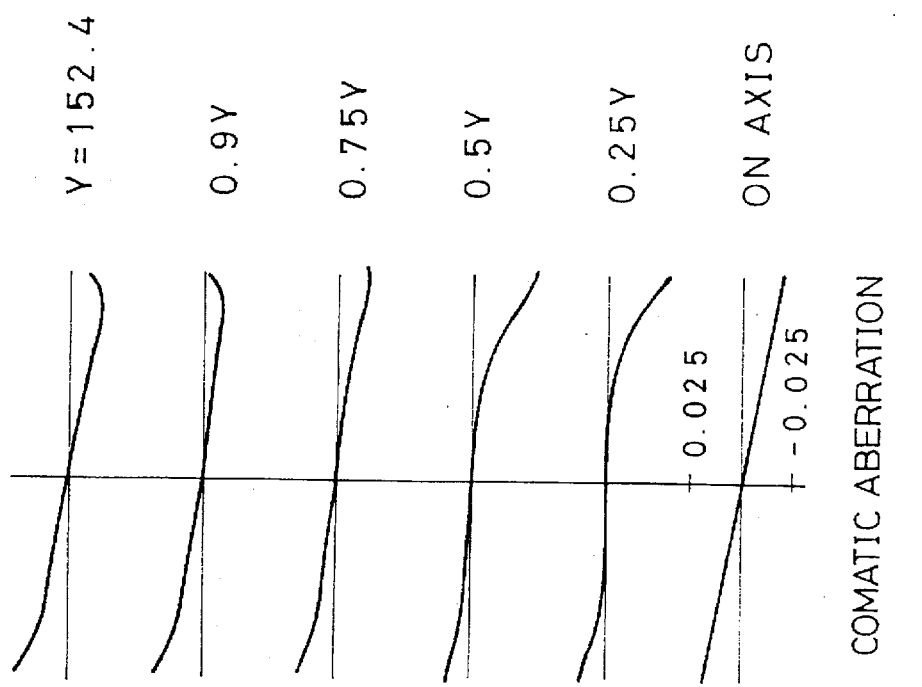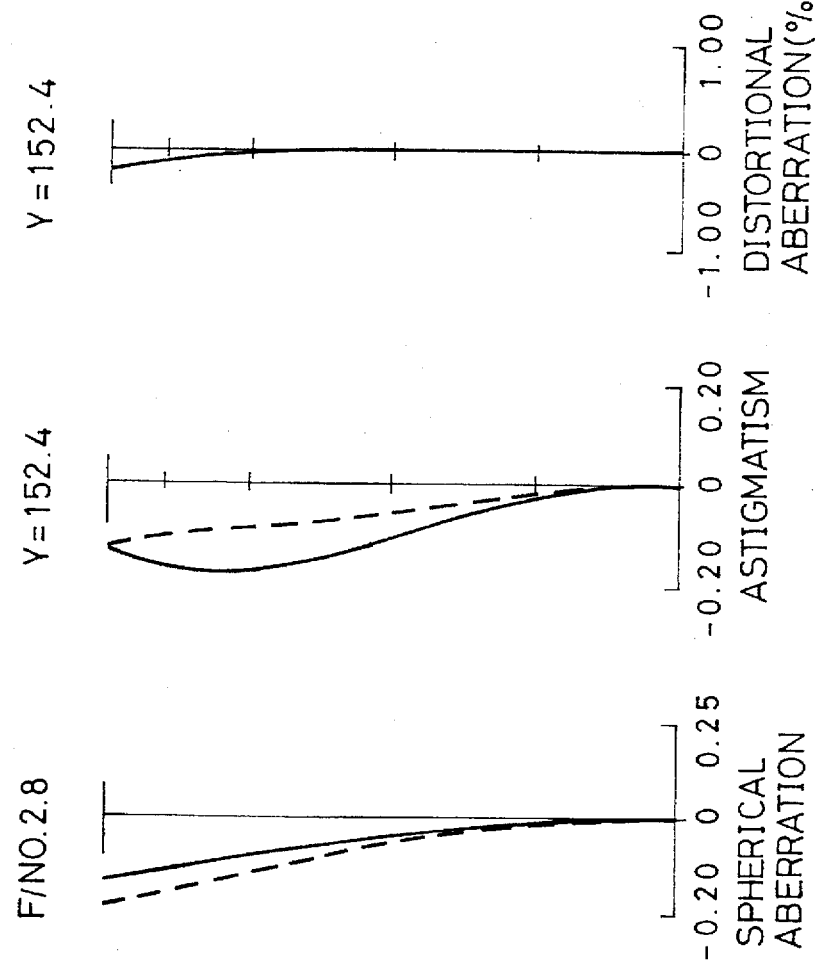

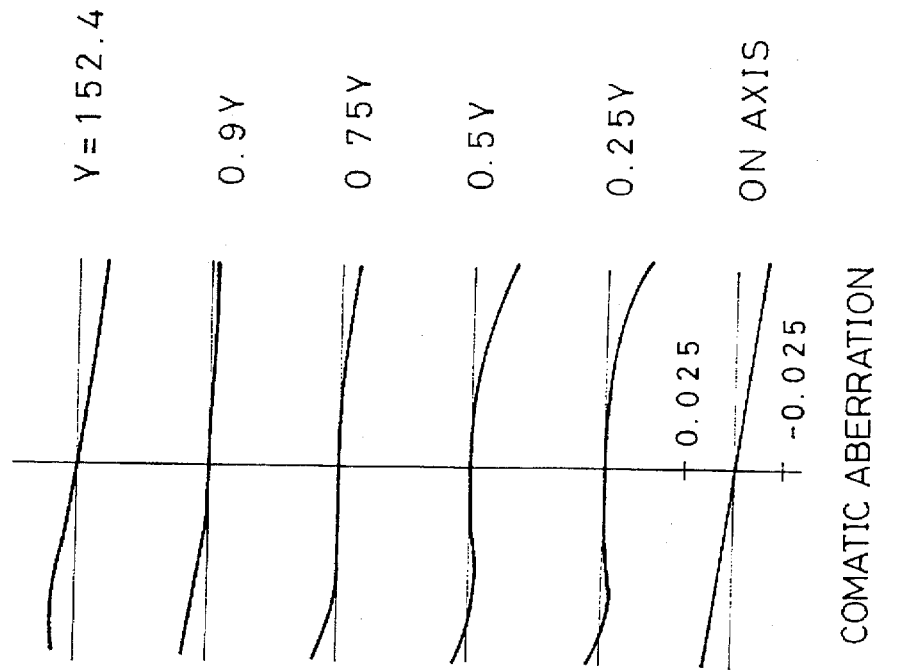
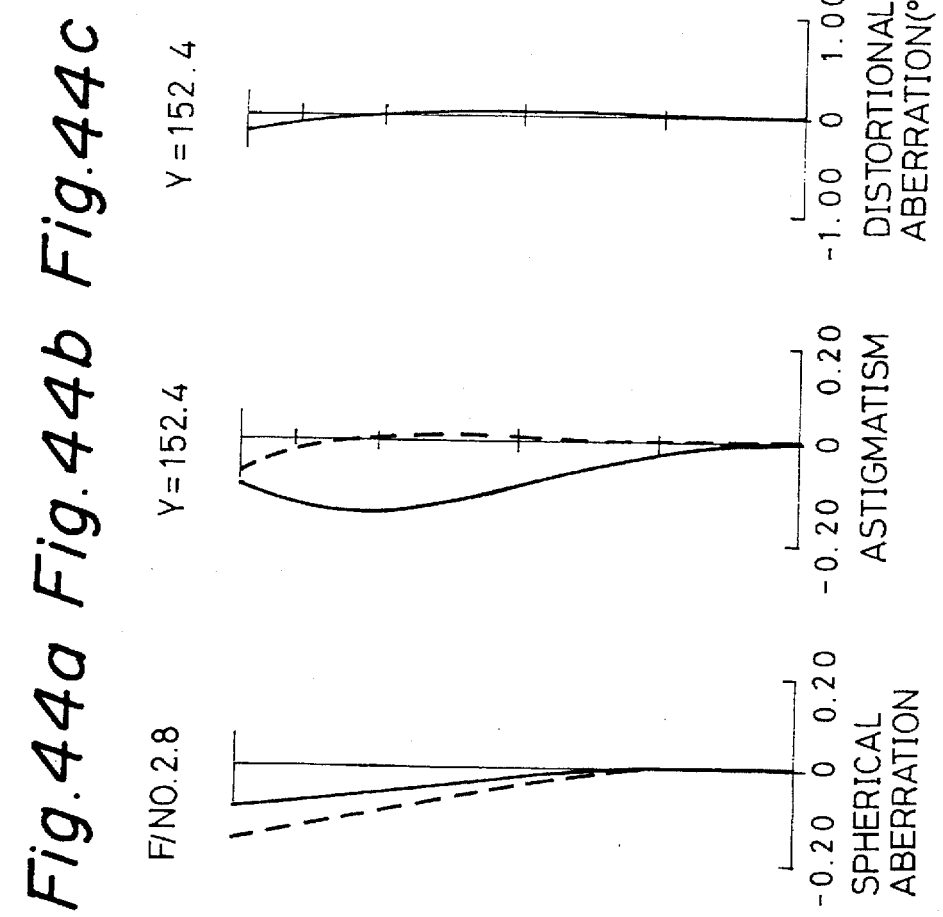

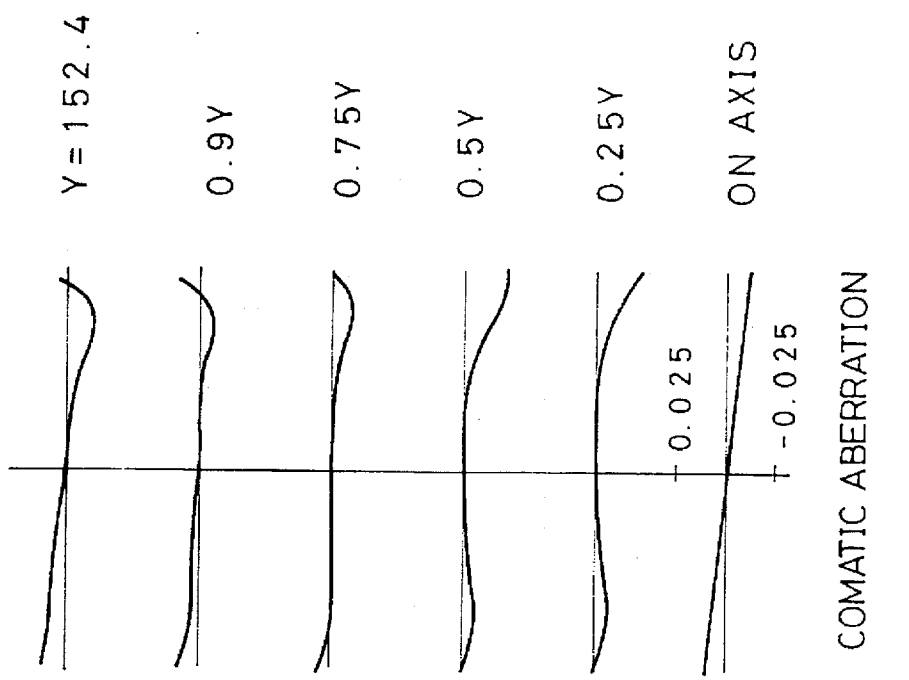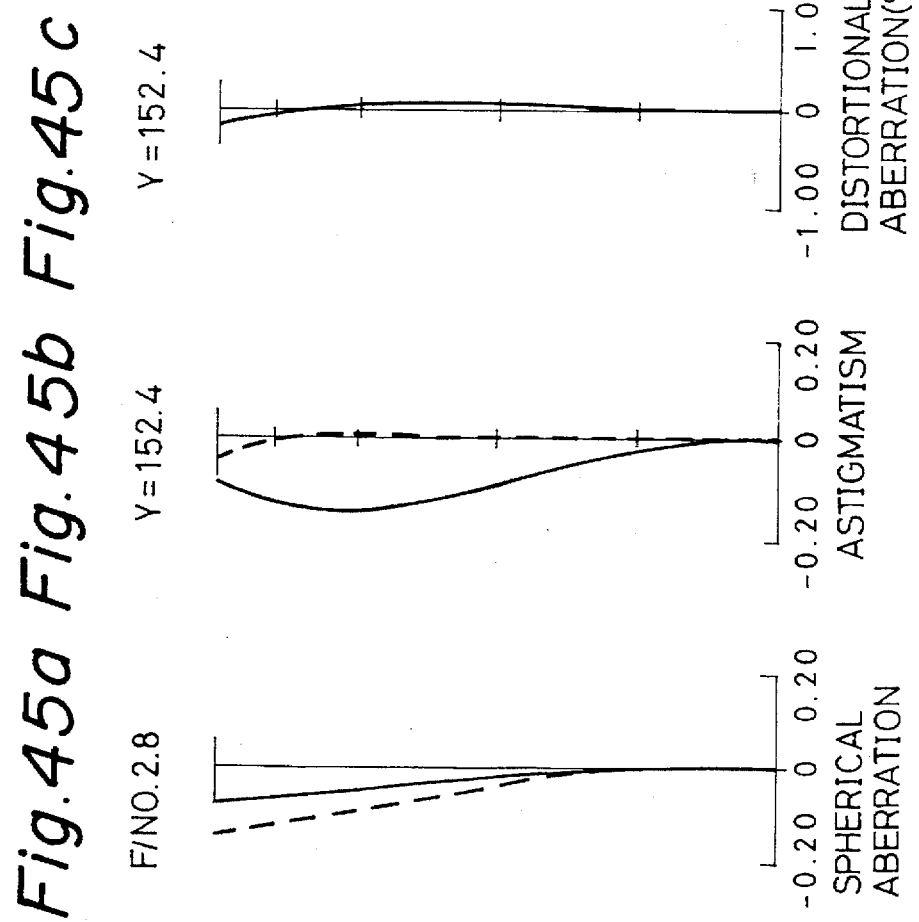

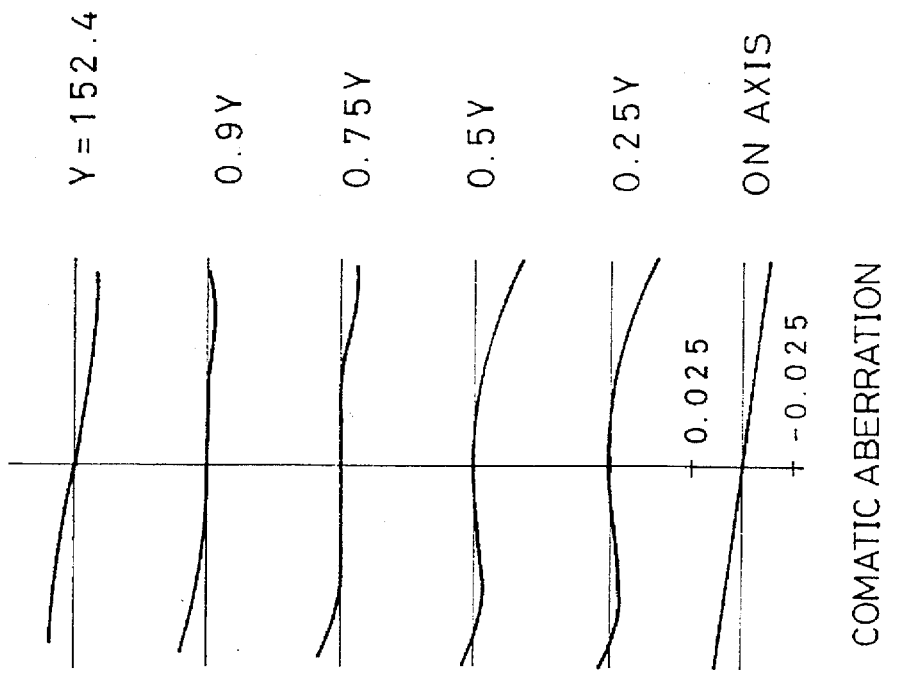
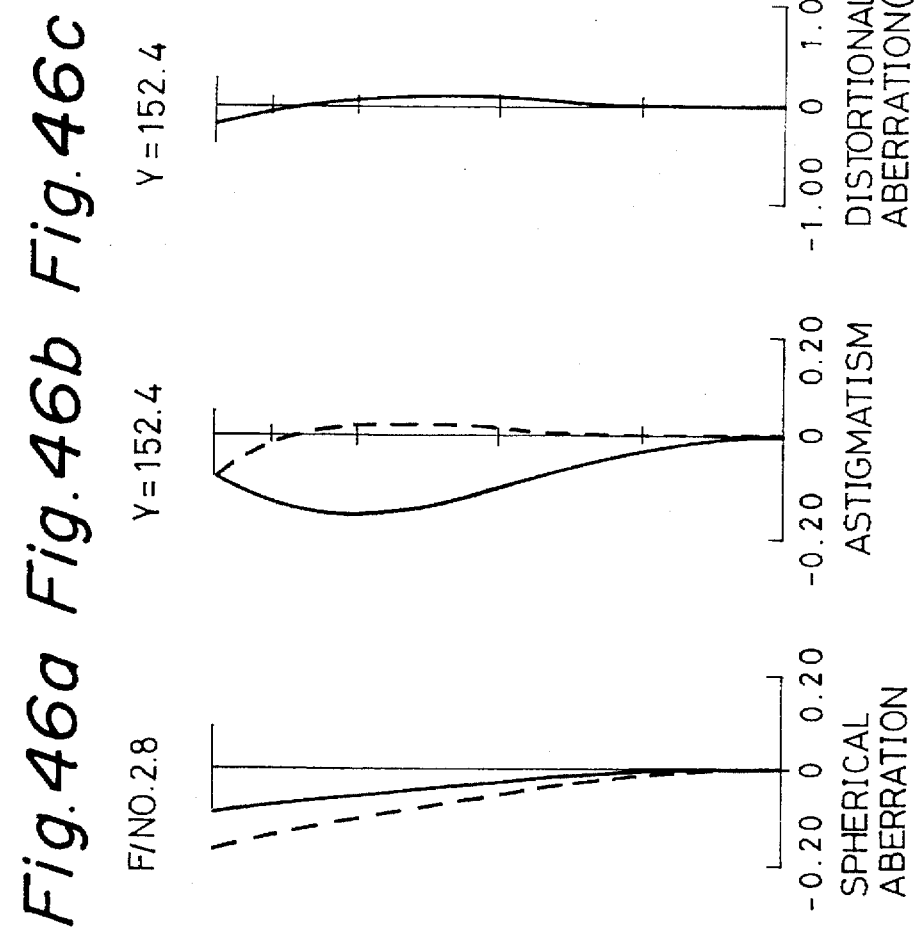

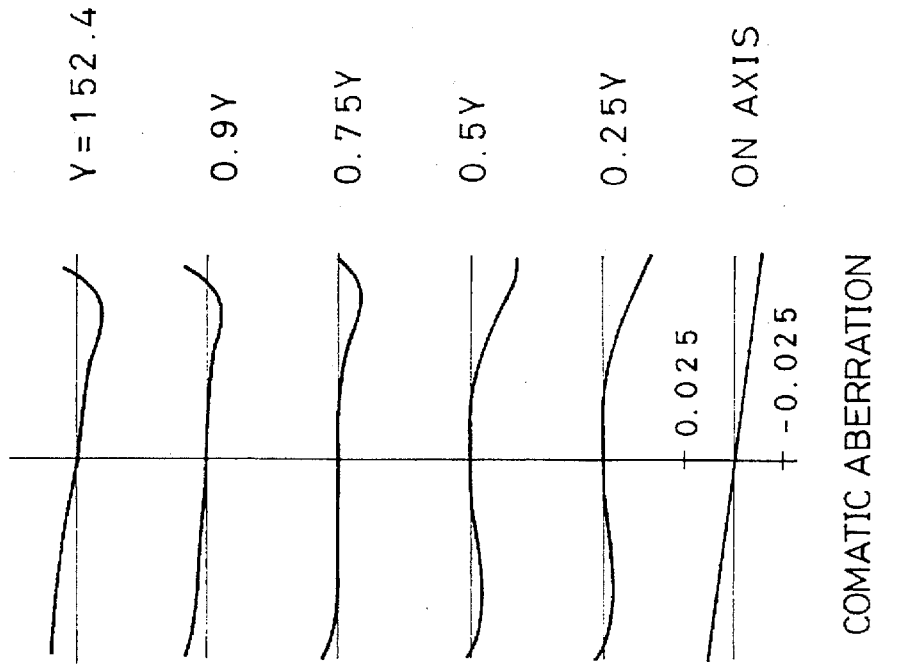
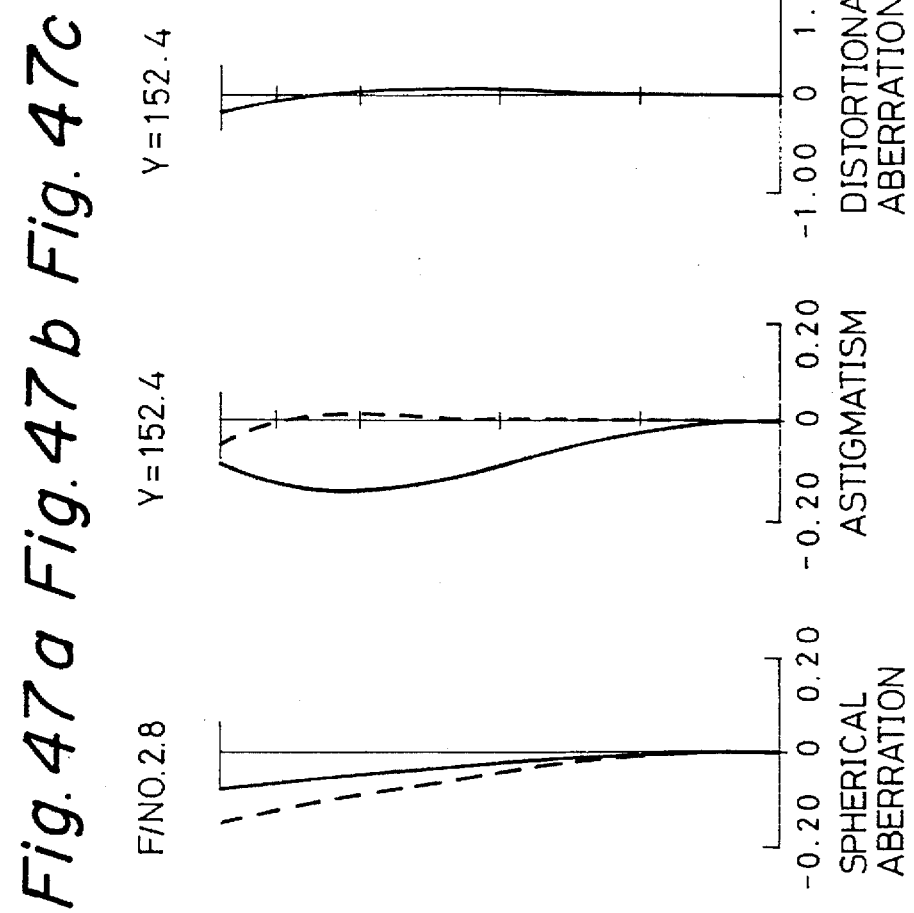

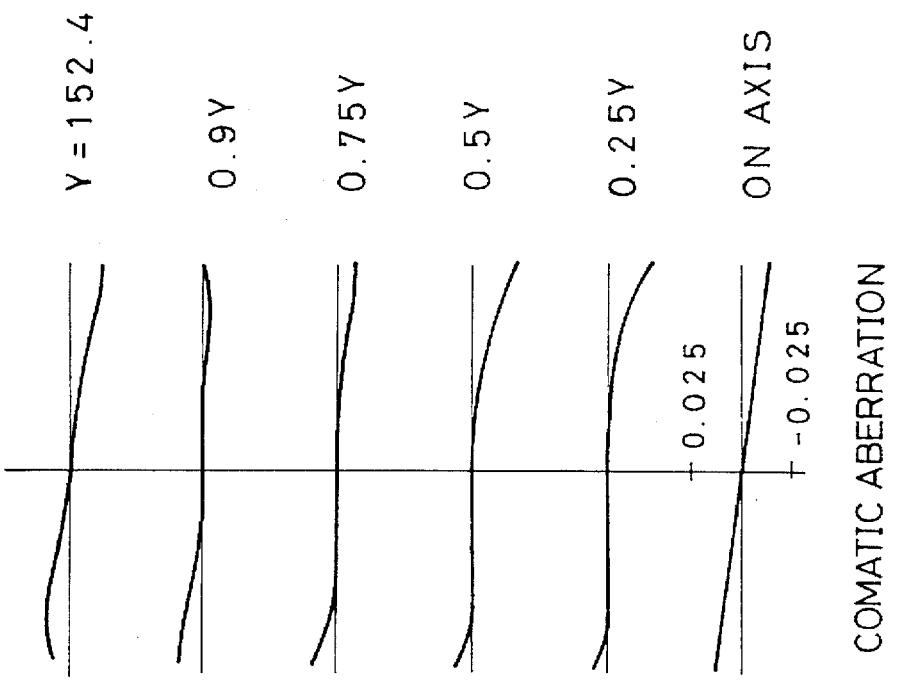
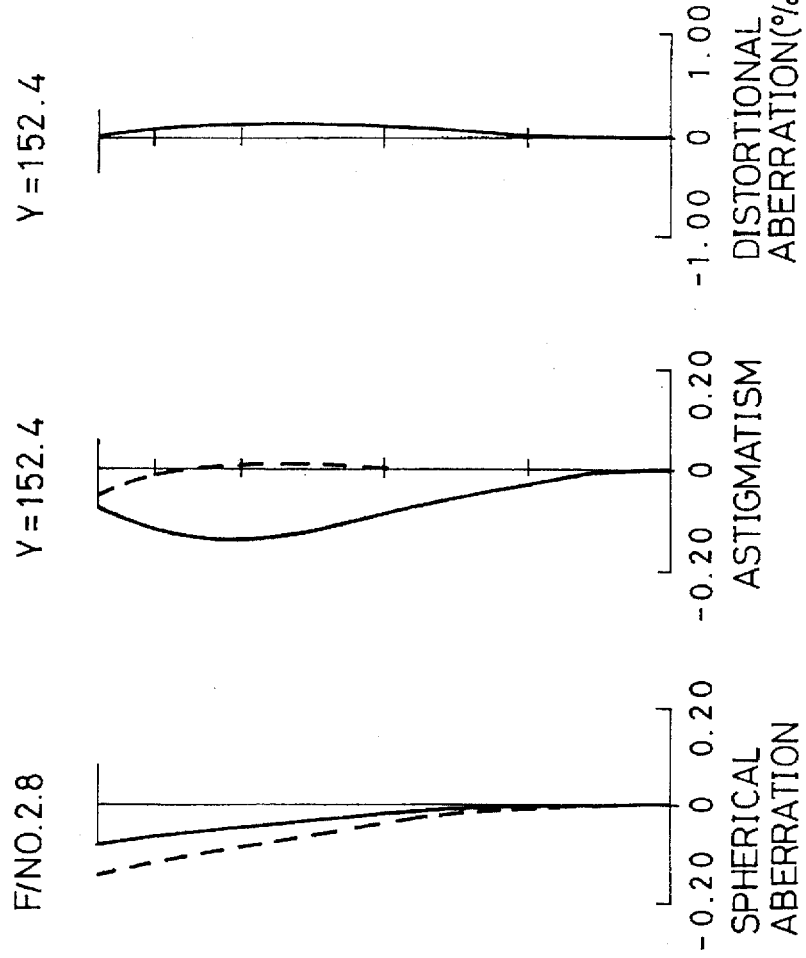
Fig. 48a Fig. 48b Fig. 48c Fig. 48d

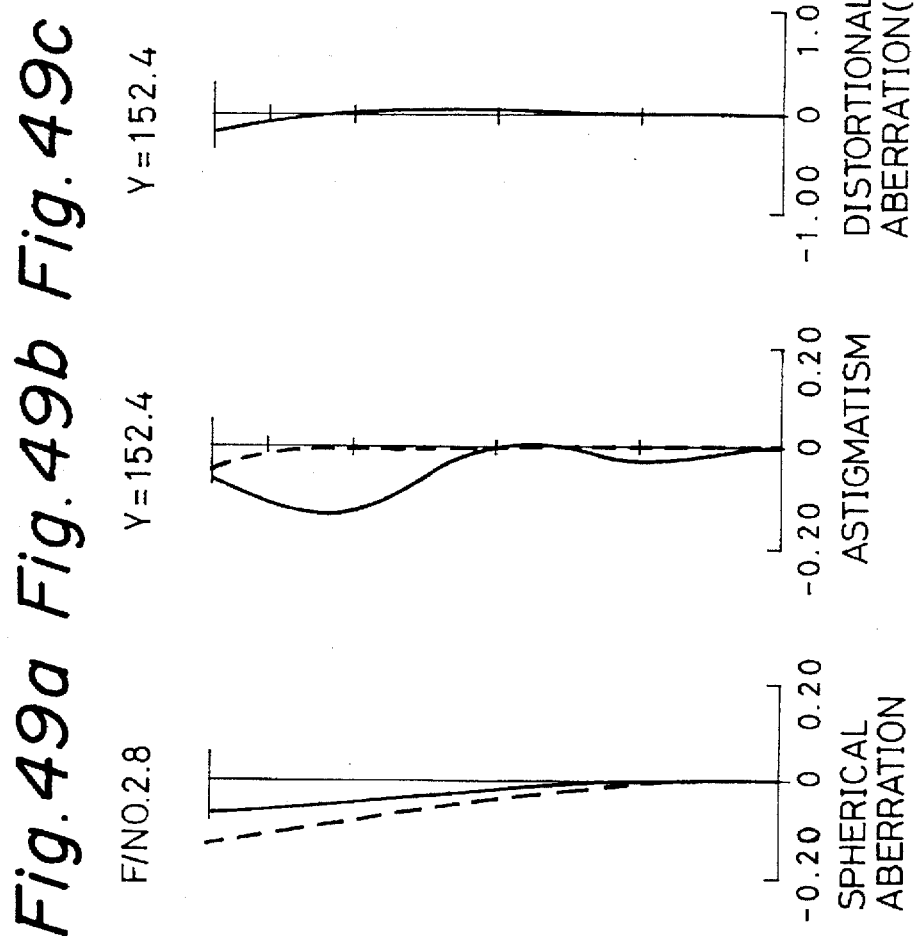

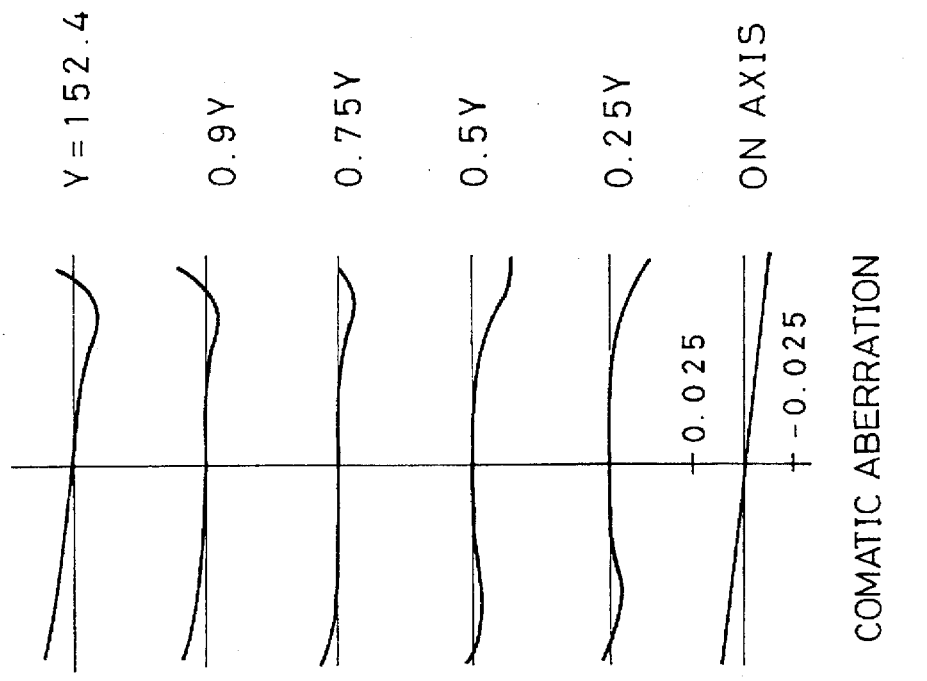
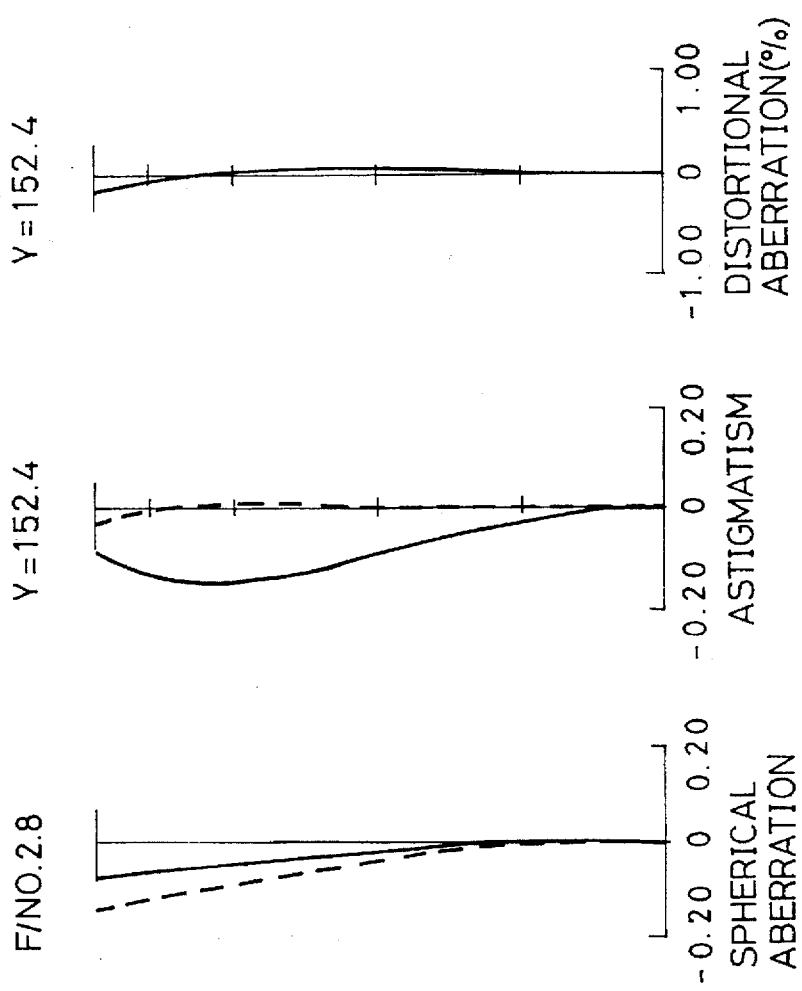
Fig.50a  Fig.50b  Fig.50c  Fig.50d

LENS FOR READING AN ORIGINAL IMAGE

BACKGROUND OF THE INVENTION

1. Field of the Invention

The present invention relates to a lens system for reading an original document image. More particularly, the present invention relates to a lens system for reducing the size of an original image by about 1/10 and forming an image on a solid-state image sensor such as a charge coupled device (CCD), etc. This lens system can be used for an image scanner for a facsimile telegraph, a digital copying machine, a computer or a word processor.

2. Description of the Related Art

An original image is scanned by a solid-state image sensor such as a charge coupled device (CCD) and is changed to a signal in an original reading operation. Such an original reading operation is widely performed in an image scanner such as a facsimile telegraph, a digital copying machine, a computer, a word processor, etc.

In the original reading operation, a lens for reading an original is used to focus and form a reduced image of the original image on the solid-state image sensor. This original reading lens must generally focus and form an image having a high contrast on an image face until a high spatial frequency so as to achieve high resolution. Further, this original reading lens must generally have a vignetting factor close to 100% until a peripheral portion of the image. Furthermore, it is desirable for the original reading lens to have a wide field angle and a large aperture so as to make an original reader compact and read the image at a high speed.

For example, when the original reading lens having a half field angle of 19 degrees and an F/No of about 2.8 degrees in performance is realized to satisfy such requirements, the number of constructional lenses is generally set to about six so that it is difficult to make the original reader compact and cost of the original reader is increased.

Japanese Patent Application Laying Open (KOKAI) No. 4-338908 shows another lens for reading an original in which the number of constructional lenses is reduced and set to three to make the original reading lens compact. However, the number of conditions to be satisfied is increased to obtain a preferable lens performance by a small number of constructional lenses such as three lenses. Further, it is necessary to use a complicated aspherical surface as a lens face.

SUMMARY OF THE INVENTION

It is therefore an object of the present invention to provide a lens system for reading an original in which the original reading lens system is constructed by three lenses in three lens groups so that the number of constructional lenses is reduced and the original reading lens system can be made compact and a field angle can be widened and high performance of the original reading lens system can be easily realized.

In accordance with a first construction of the present invention, the above object of the present invention can be achieved by a lens system for reading an original document image and comprising first to third lens groups sequentially arranged from an object side toward an image side; the first lens group being constructed by a first lens as a positive meniscus lens having a convex face on the object side; the second lens group being constructed by a second lens as a biconcave lens; the third lens group being constructed by a third lens as a biconvex lens; the first lens being constructed by a refractive index distribution type lens having a refractive index changed in a direction perpendicular to an optical axis of the original reading lens; and each of the second and third lenses being constructed by a refractive index distribution type lens having a refractive index changed in a direction of the optical axis.

In accordance with a fourth construction of the present invention, the above object can be also achieved by a lens system for reading an original and comprising first to third lens groups sequentially arranged from an object side toward an image side; the first lens group being constructed by a first lens as a meniscus lens having a convex face on the object side; the second lens group being constructed by a second lens as a biconcave lens; the third lens group being constructed by a third lens as a biconvex lens; and at least one of the first, second and third lenses being constructed by a refractive index distribution type lens.

In each of the first and fourth constructions of the present invention, the original reading lens system is constructed by three lenses in three lens groups so that the number of constructional lenses is reduced and the original reading lens can be made compact and a field angle can be widened and high performance of the original reading lens can be easily realized.

Further objects and advantages of the present invention will be apparent from the following description of the preferred embodiments of the present invention as illustrated in the accompanying drawings.

BRIEF DESCRIPTION OF THE DRAWINGS

FIGS. 26a, 26b, 26c and 26d are respectively diagrams of spherical aberration, astigmatism, distortional aberration and comatic aberration of the original reading lens with respect to the Embodiment 1;

FIGS. 27a, 27b, 27c and 27d are respectively diagrams of spherical aberration, astigmatism, distortional aberration and comatic aberration of the original reading lens with respect to the Embodiment 2;

FIGS. 28a, 28b, 28c and 28d are respectively diagrams of spherical aberration, astigmatism, distortional aberration and comatic aberration of the original reading lens with respect to the Embodiment 3;

FIGS. 29a, 29b, 29c and 29d are respectively diagrams of spherical aberration, astigmatism, distortional aberration and comatic aberration of the original reading lens with respect to the Embodiment 4;

FIGS. 30a, 30b, 30c and 30d are respectively diagrams of spherical aberration, astigmatism, distortional aberration and comatic aberration of the original reading lens with respect to the Embodiment 5;

FIGS. 31a, 31b, 31c and 31d are respectively diagrams of spherical aberration, astigmatism, distortional aberration and comatic aberration of the original reading lens with respect to the Embodiment 6;

FIGS. 32a, 32b, 32c and 32d are respectively diagrams of spherical aberration, astigmatism, distortional aberration and comatic aberration of the original reading lens with respect to the Embodiment 7;

FIGS. 33a, 33b, 33c and 33d are respectively diagrams of spherical aberration, astigmatism, distortional aberration and comatic aberration of the original reading lens with respect to the Embodiment 8;

FIGS. 34a, 34b, 34c and 34d are respectively diagrams of spherical aberration, astigmatism, distortional aberration and comatic aberration the original reading lens with respect to the Embodiment 9;

FIGS. 35a, 35b, 35c and 35d are respectively diagrams of spherical aberration, astigmatism, distortional aberration and comatic aberration of the original reading lens with respect to the Embodiment 10;

FIGS. 36a, 36b, 36c and 36d are respectively diagrams of spherical aberration, astigmatism, distortional aberration and comatic aberration of the original reading lens with respect to the Embodiment 11;

FIGS. 38a, 38b, 38c and 38d are respectively diagrams of spherical aberration, astigmatism, distortional aberration and comatic aberration of the original reading lens with respect to the Embodiment 13;

FIGS. 39a, 39b, 39c and 39d are respectively diagrams of spherical aberration, astigmatism, distortional aberration and comatic aberration of the original reading lens with respect to the Embodiment 14;

FIGS. 41a, 41b, 41c and 41d are respectively diagrams of spherical aberration, astigmatism, distortional aberration and comatic aberration of the original reading lens with respect to the Embodiment 16;

FIGS. 42a, 42b, 42c and 42d are respectively diagrams of spherical aberration, astigmatism, distortional aberration and comatic aberration of the original reading lens with respect to the Embodiment 17;

FIGS. 43a, 43b, 43c and 43d are respectively diagrams of spherical aberration, astigmatism, distortional aberration and comatic aberration of the original reading lens with respect to the Embodiment 18;

FIGS. 44a, 44b, 44c and 44d are respectively diagrams of spherical aberration, astigmatism, distortional aberration and comatic aberration of the original reading lens with respect to the Embodiment 19;

FIGS. 45a, 45b, 45c and 45d are respectively diagrams of spherical aberration, astigmatism, distortional aberration and comatic aberration of the original reading lens with respect to the Embodiment 20;

FIGS. 46a, 46b, 48c and 48d are respectively diagrams of spherical aberration, astigmatism, distortional aberration and comatic aberration of the original reading lens with respect to the Embodiment 21;

FIGS. 47a, 47b, 47c and 47d are respectively diagrams of spherical aberration, astigmatism, distortional aberration and comatic aberration of the original reading lens with respect to the Embodiment 22;

FIGS. 48a, 48b, 48c and 48d are respectively diagrams of spherical aberration, astigmatism, distortional aberration and comatic aberration of the original reading lens with respect to the Embodiment 23;

FIGS. 49a, 49b, 49c and 49d are respectively diagrams of spherical aberration, astigmatism, distortional aberration and comatic aberration of the original reading lens with respect to the Embodiment 24; and FIGS. 50a, 50b, 50c and 50d are respectively diagrams of spherical aberration, astigmatism, distortional aberration and comatic aberration of the original reading lens with respect to the Embodiment 25.

DESCRIPTION OF THE PREFERRED EMBODIMENTS

The preferred embodiments of a lens system for reading an original in the present invention will next be described in detail with reference to the accompanying drawings.

Figure 1:
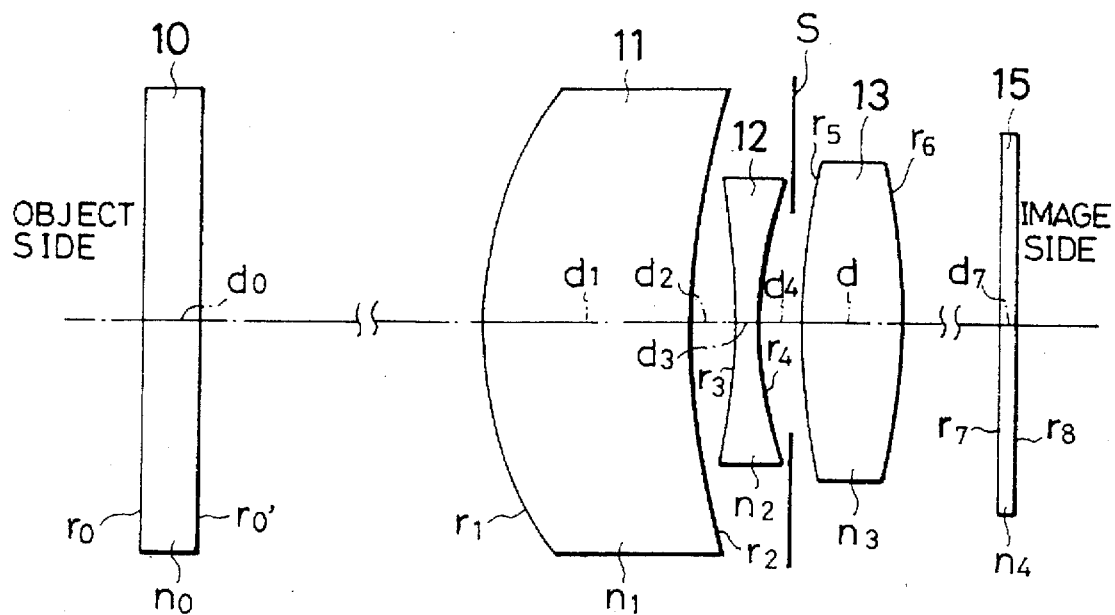
FIG. 1 is a view showing the construction of a lens for reading an original in accordance with an Embodiment 1 of the present invention.

As shown in FIG. 1, a lens system for reading an original has first to third lens groups sequentially arranged from an object side toward an image side in accordance with each of first to third constructions of the present invention.

A first lens 11 constitutes the first lens group and is constructed by a positive meniscus lens having a convex face on the object side. In FIG. 1, the object side is set to a left-hand side.

A second lens 12 constitutes the second lens group and is constructed by a biconcave lens.

A third lens 13 constitutes the third lens group and is constructed by a biconvex lens.

Accordingly, the original reading lens is constructed by three lenses in the three lens groups.

The first lens 11 is constructed by a refractive index distribution type lens having a refractive index changed in a direction perpendicular to an optical axis of the original reading lens. The refractive index of the refractive index distribution type lens is changed in the direction perpendicular to the optical axis in accordance with a distance from the optical axis. This refractive index distribution type lens is called a refractive index distribution type lens of a radial type.

Each of the second lens 12 and the third lens 13 is constructed by a refractive index distribution type lens having a refractive index changed in an optical axis direction. The refractive index of the refractive index distribution type lens such as each of the second and third lenses is changed in the optical axis direction. This refractive index distribution type lens is called a refractive index distribution type lens of an axial type.

In accordance with the second construction of the present invention, the refractive index of a portion of the first lens 11 as the refractive index distribution type lens of the radial type is reduced as this first lens portion is separated from the optical axis. The refractive index of a portion of the second lens 12 as the refractive index distribution type lens of the axial type is reduced as this second lens portion is directed from a vertex on the object side toward the image side. The object side vertex is set to an intersecting point between the optical axis and a second lens face on the object side. The refractive index of a portion of the third lens 13 as the refractive index distribution type lens of the axial type is increased as this third lens portion is directed from a vertex on the object side toward the image side.

In accordance with the third construction of the present invention, a refractive index distribution of the refractive index distribution type lens of the radial type can be represented by $$n(h) = N_{00} + N_{10}h^2 + N_{20}h^4 + N_{30}h^6$$

when $N_{00}$ is set to a refractive index of this lens on the optical axis, h is set to a distance from the optical axis, and $N_{10}$, $N_{20}$ and $N_{30}$ are set to distribution coefficients. A refractive index distribution of the refractive index distribution type lens of the axial type can be represented by $$n(x) = N_0 + N_1 x + N_2 x^2 + N_3 x^3$$

when $N_0$ is set to a refractive index of this lens at the object side vertex, x is set to a distance from the object side vertex, and $N_1$, $N_2$ and $N_3$ are set to distribution coefficients.

$N_{10} < 0$, $N_{20} < 0$, and $N_{30} < 0$ are set with respect to the first lens as the refractive index distribution type lens of the radial type.

$N_1 < 0$, $N_2 < 0$, and $N_3 < 0$ are set with respect to the second lens as the refractive index distribution type lens of the axial type. $N_1 > 0$, $N_2 > 0$, and $N_3 < 0$ are set with respect to the third lens as the refractive index distribution type lens of the axial type. The value of $N_3$ with respect to the third lens is determined under a condition in which the refractive index of the third lens portion is increased as the third lens portion is directed from the object side vertex toward the image side.

Figure 2:
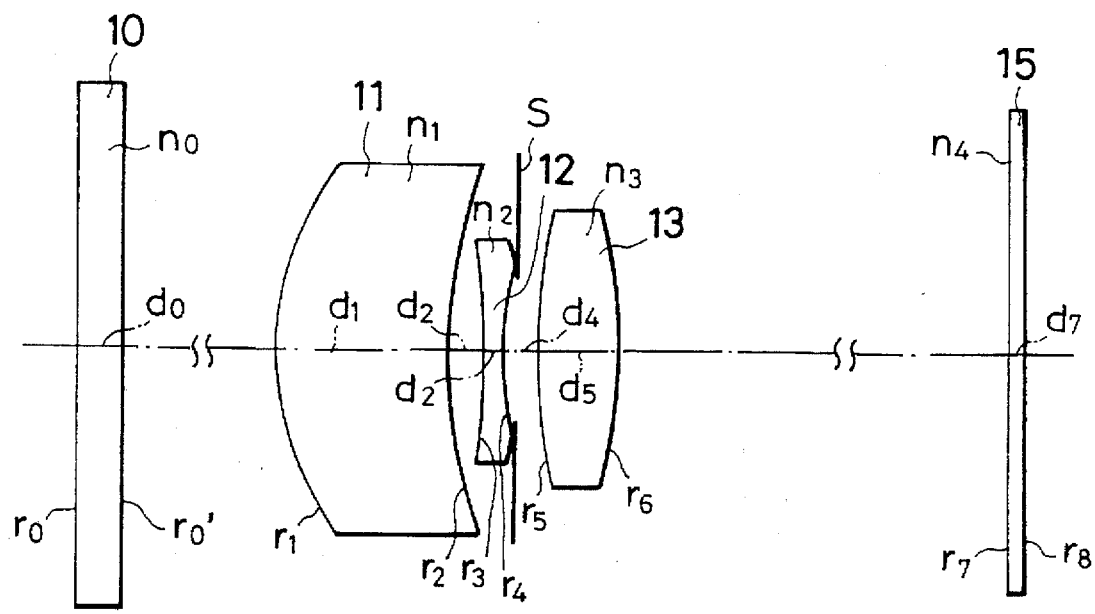
FIG. 2 is a view showing the construction of a lens for reading an original in accordance with an Embodiment 2 of the present invention.
Figure 3:
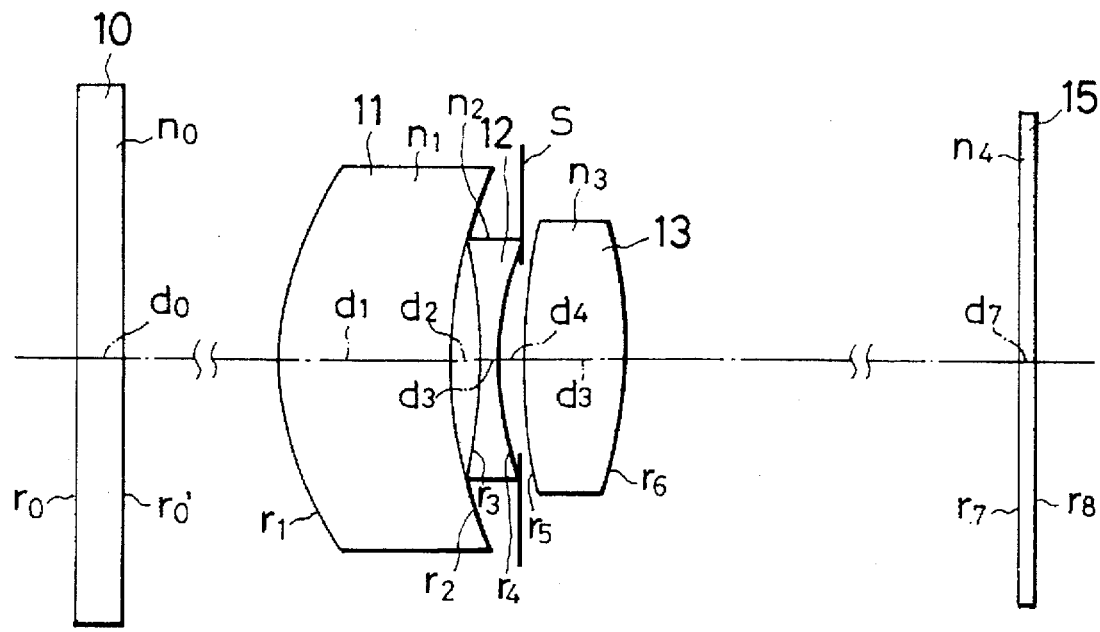
FIG. 3 is a view showing the construction of a lens for reading an original in accordance with an Embodiment 3 of the present invention.
Figure 4:
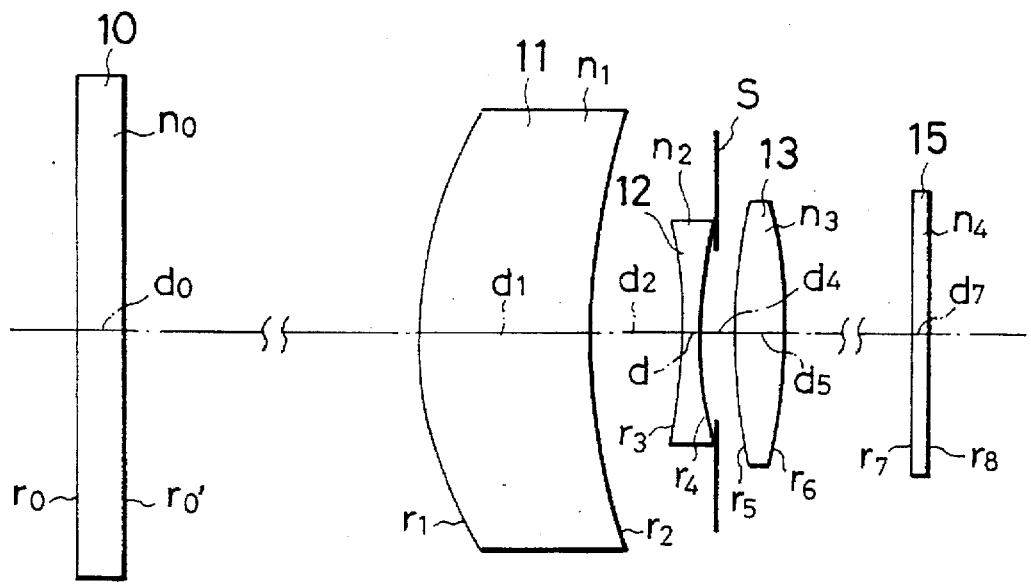
FIG. 4 is a view showing the construction of a lens for reading an original in accordance with an Embodiment 4 of the present invention.
Figure 5:
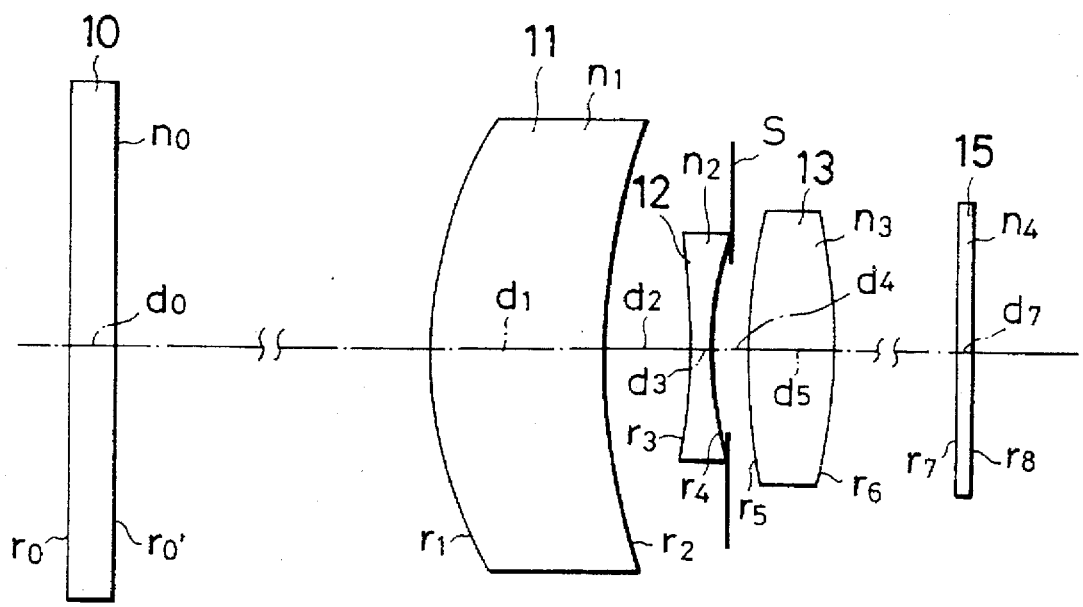
FIG. 5 is a view showing the construction of a lens for reading an original in accordance with an Embodiment 5 of the present invention.
Figure 6:
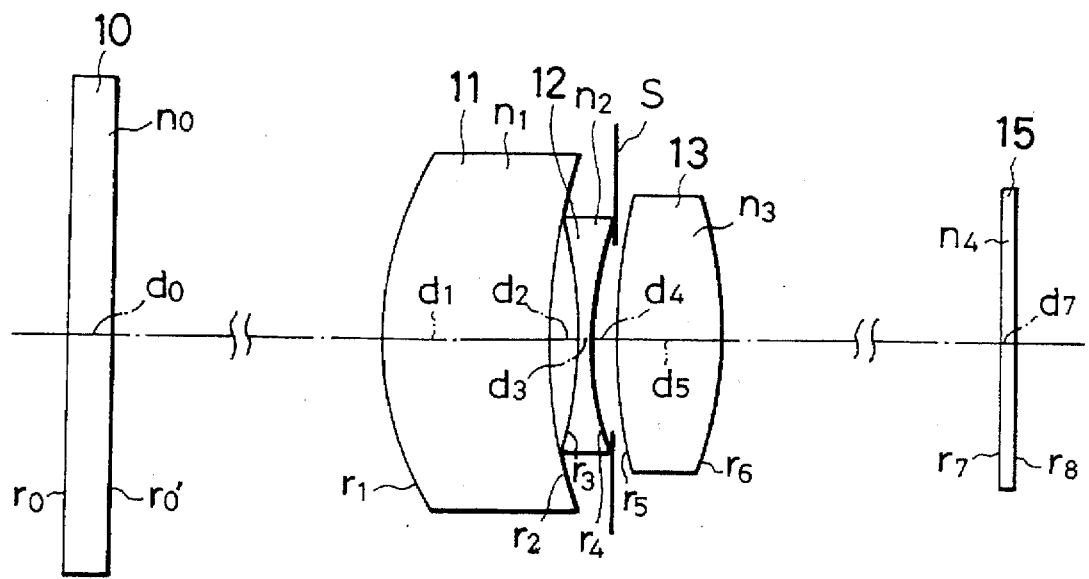
FIG. 6 is a view showing the construction of a lens for reading an original in accordance with an Embodiment 6 of the present invention.
Figure 7:
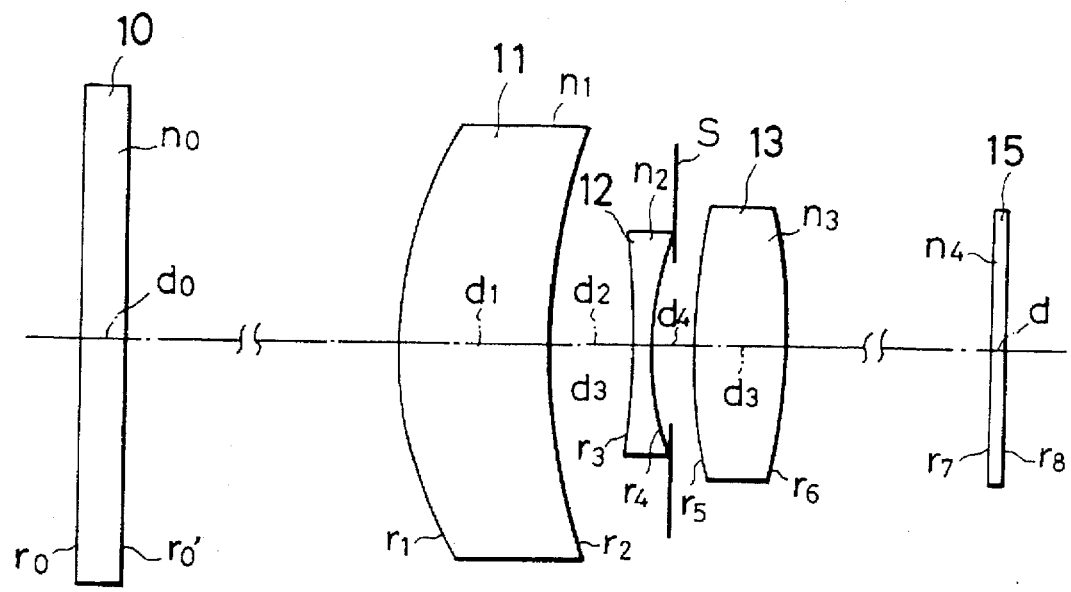
FIG. 7 is a view showing the construction of a lens for reading an original in accordance with an Embodiment 7 of the present invention.
Figure 8:
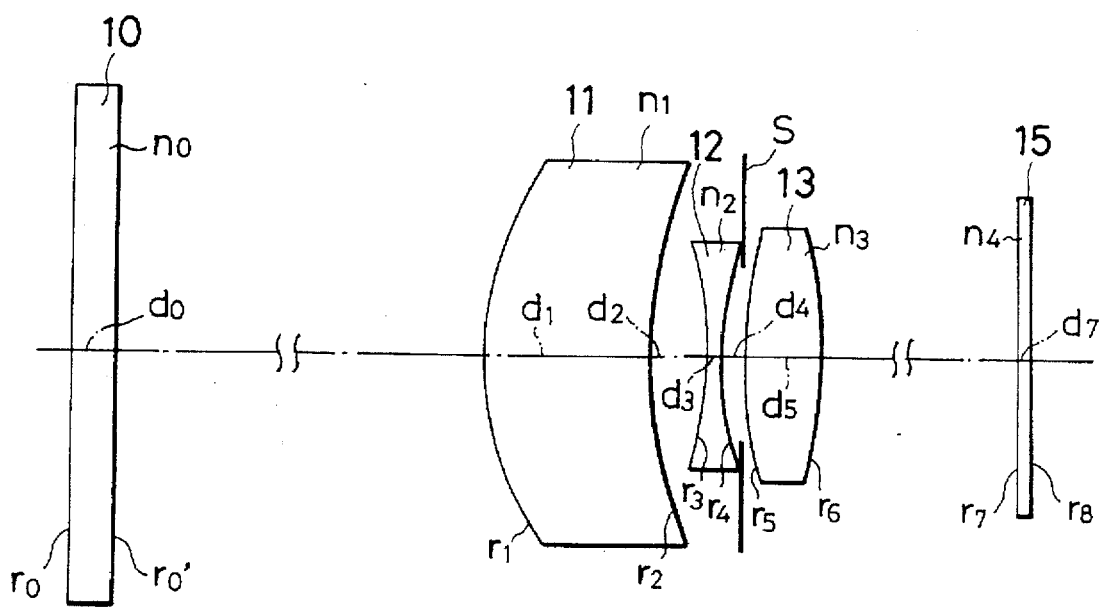
FIG. 8 is a view showing the construction of a lens for reading an original in accordance with an Embodiment 8 of the present invention.
Figure 9:
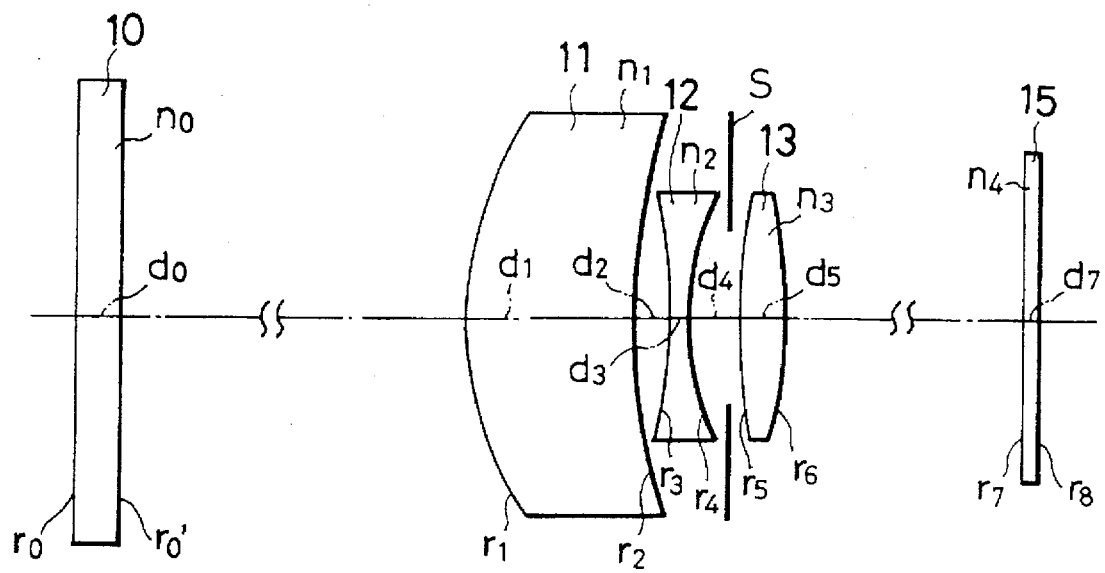
FIG. 9 is a view showing the construction of a lens for reading an original in accordance with an Embodiment 9 of the present invention.
Figure 10:
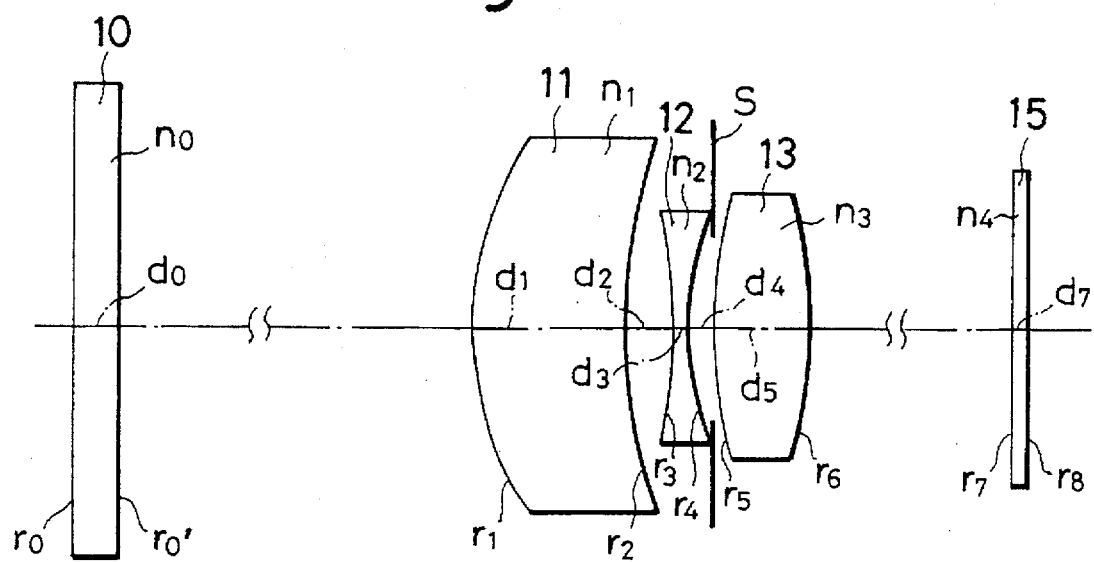
FIG. 10 is a view showing the construction of a lens for reading an original in accordance with an Embodiment 10 of the present invention.
Figure 11:
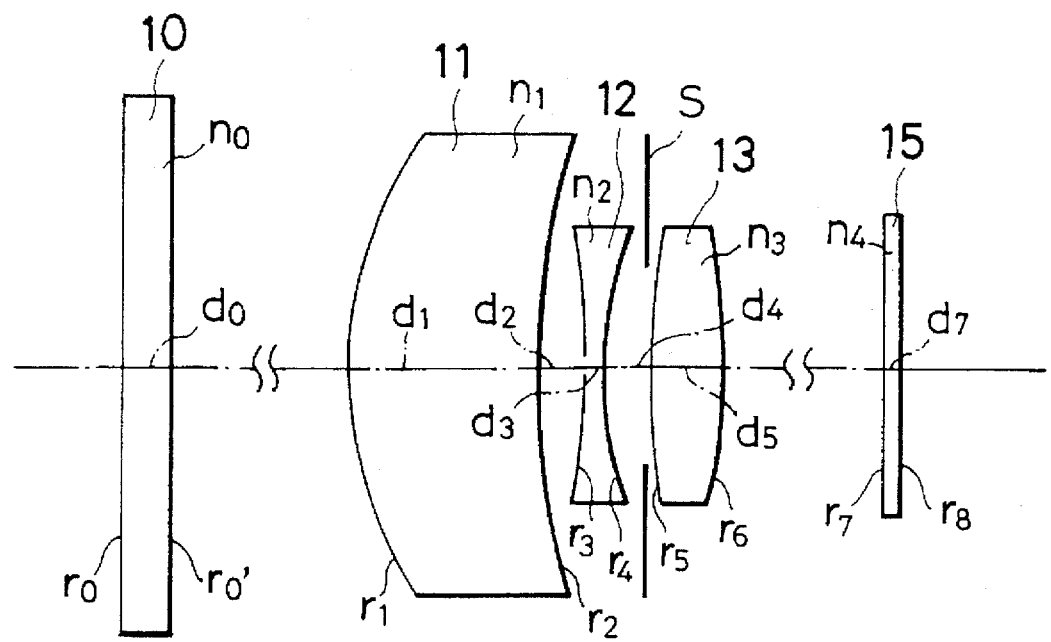
FIG. 11 is a view showing the construction of a lens for reading an original in accordance with an Embodiment 11 of the present invention.
Figure 12:
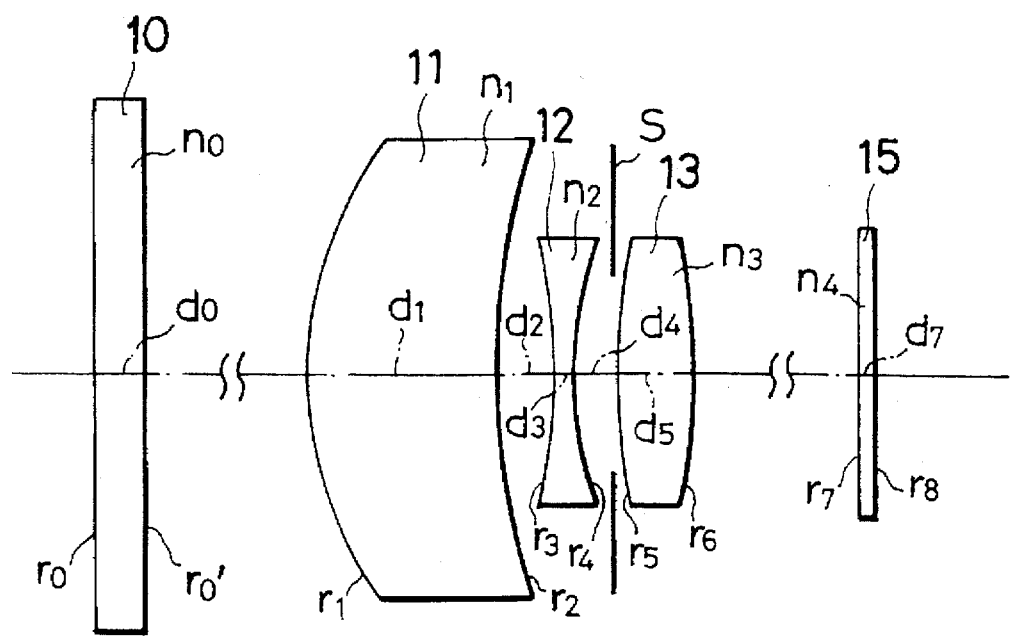
FIG. 12 is a view showing the construction of a lens for reading an original in accordance with an Embodiment 12 of the present invention.
Figure 13:
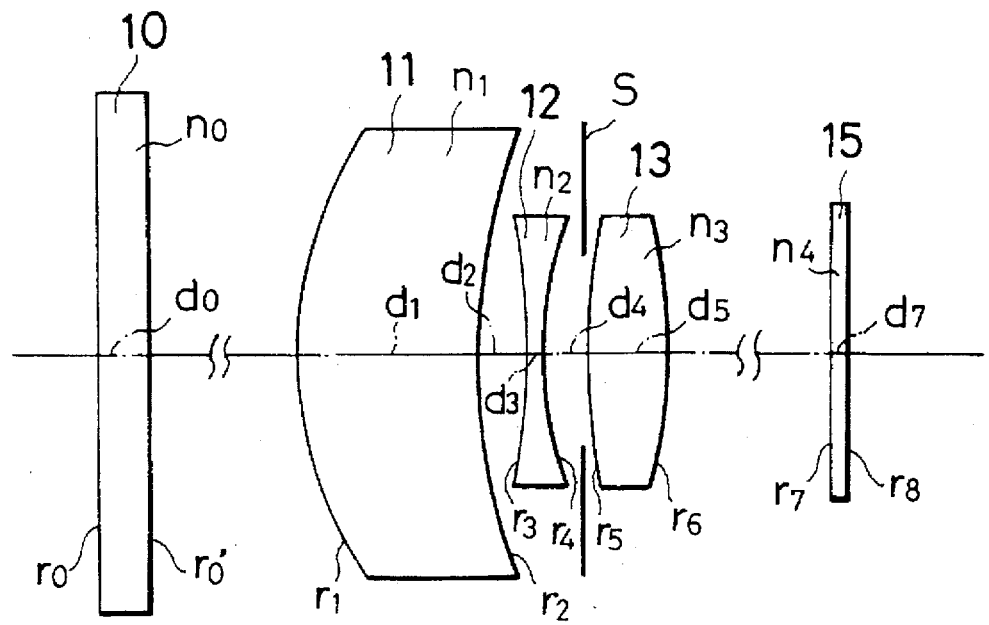
FIG. 13 is a view showing the construction of a lens for reading an original in accordance with an Embodiment 13 of the present invention.
Figure 14:
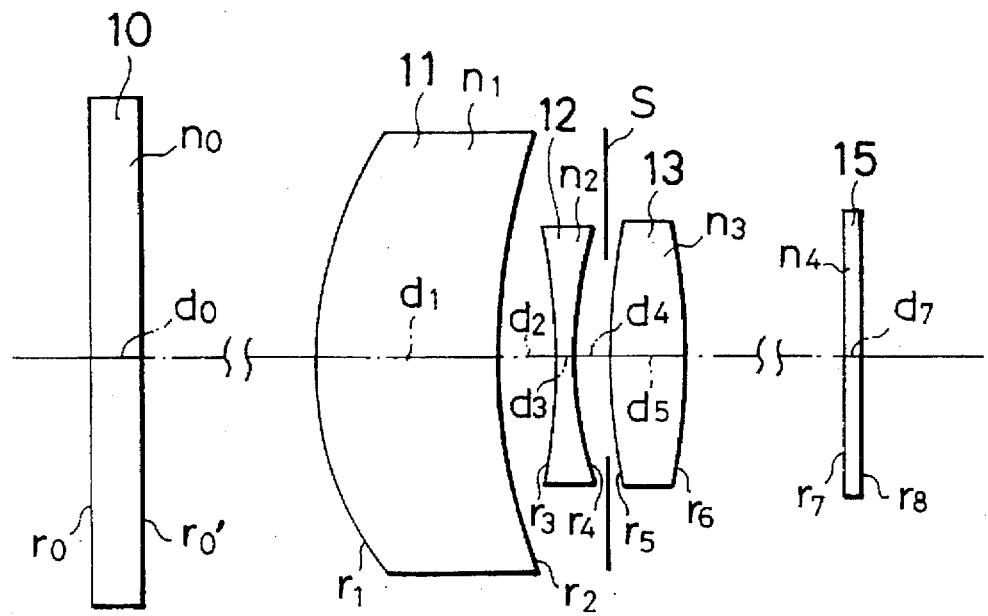
FIG. 14 is a view showing the construction of a lens for reading an original in accordance with an Embodiment 14 of the present invention.
Figure 15:
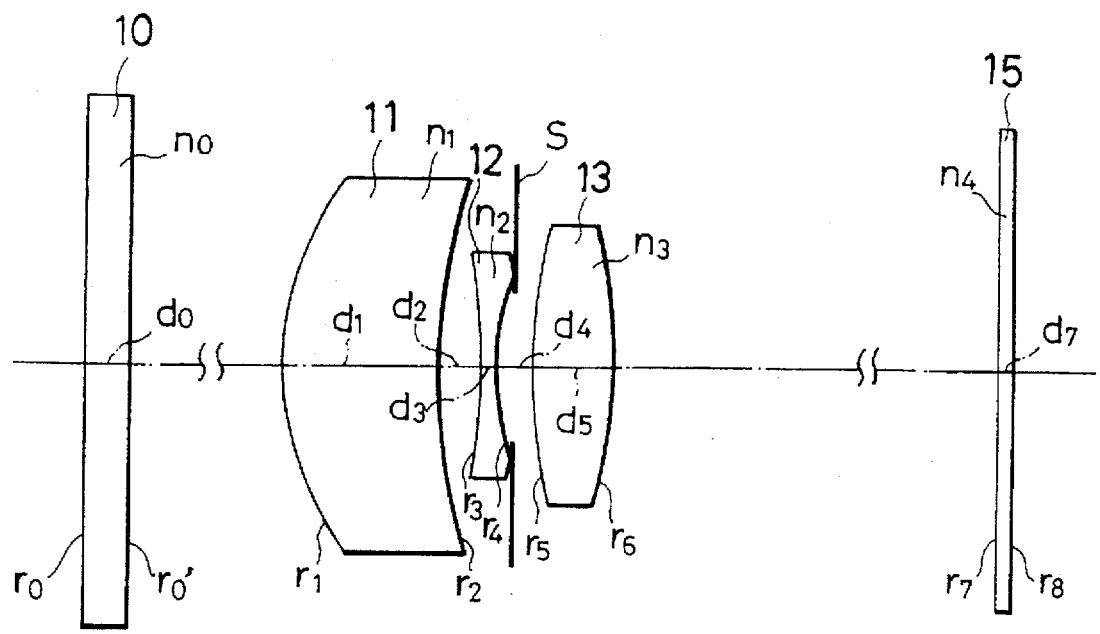
FIG. 15 is a view showing the construction of a lens for reading an original in accordance with an Embodiment 15 of the present invention.
Figure 16:
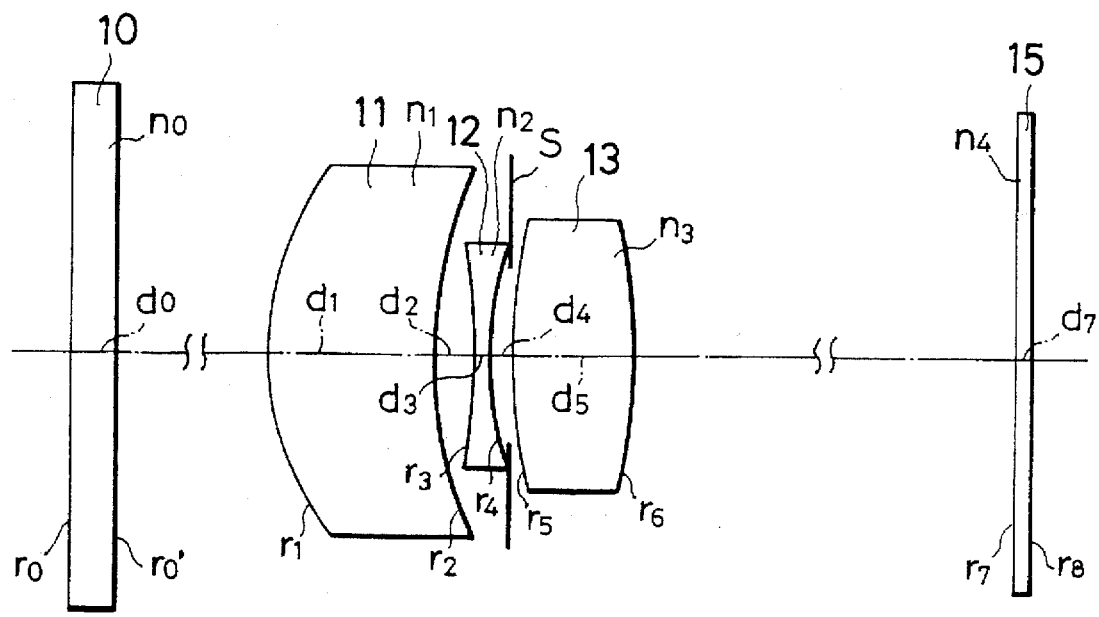
FIG. 16 is a view showing the construction of a lens for reading an original in accordance with an Embodiment 16 of the present invention.
Figure 17:
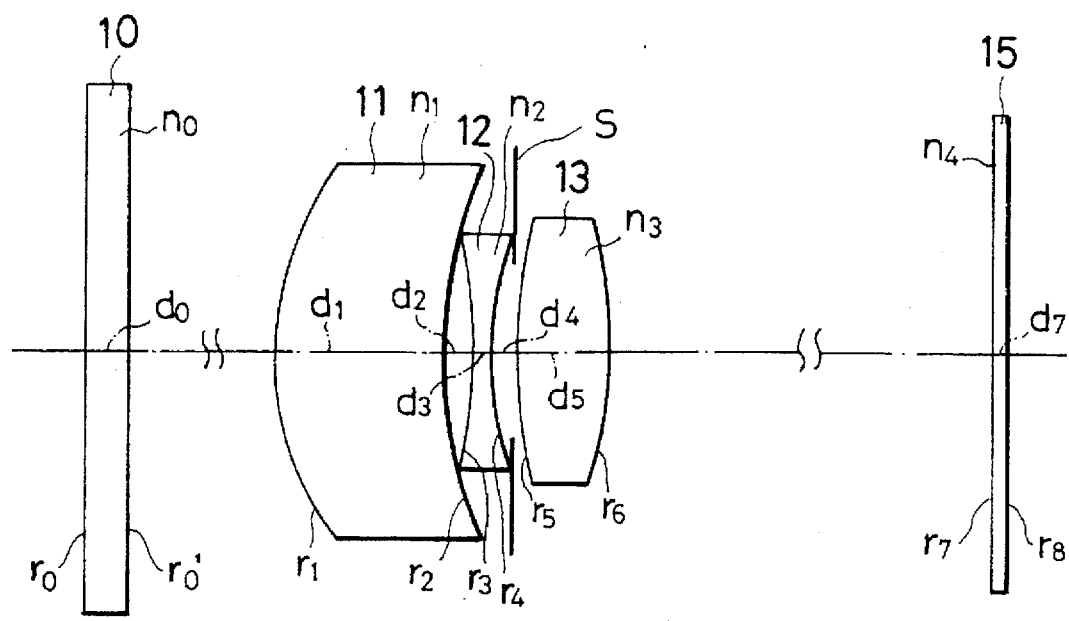
FIG. 17 is a view showing the construction of a lens for reading an original in accordance with an Embodiment 17 of the present invention.
Figure 18:
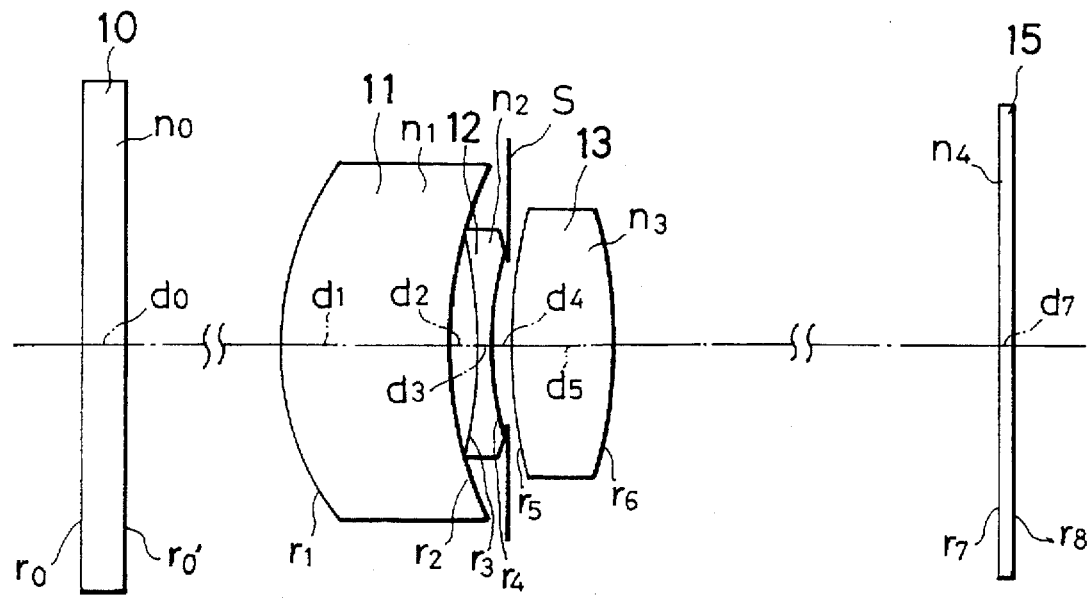
FIG. 18 is a view showing the construction of a lens for reading an original in accordance with an Embodiment 18 of the present invention.
Figure 19:
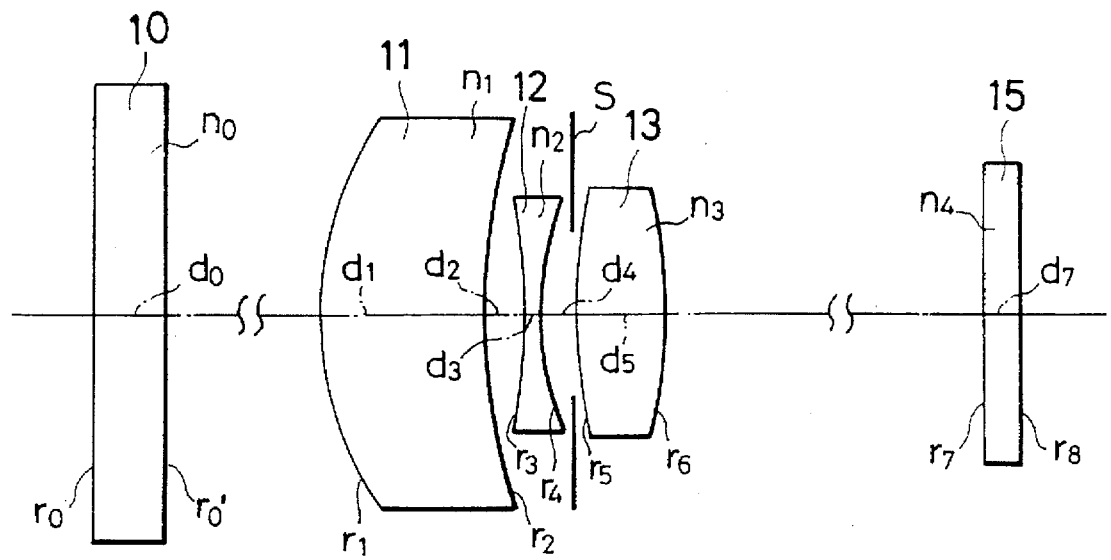
FIG. 19 is a view showing the construction of a lens for reading an original in accordance with an Embodiment 19 of the present invention.
Figure 20:
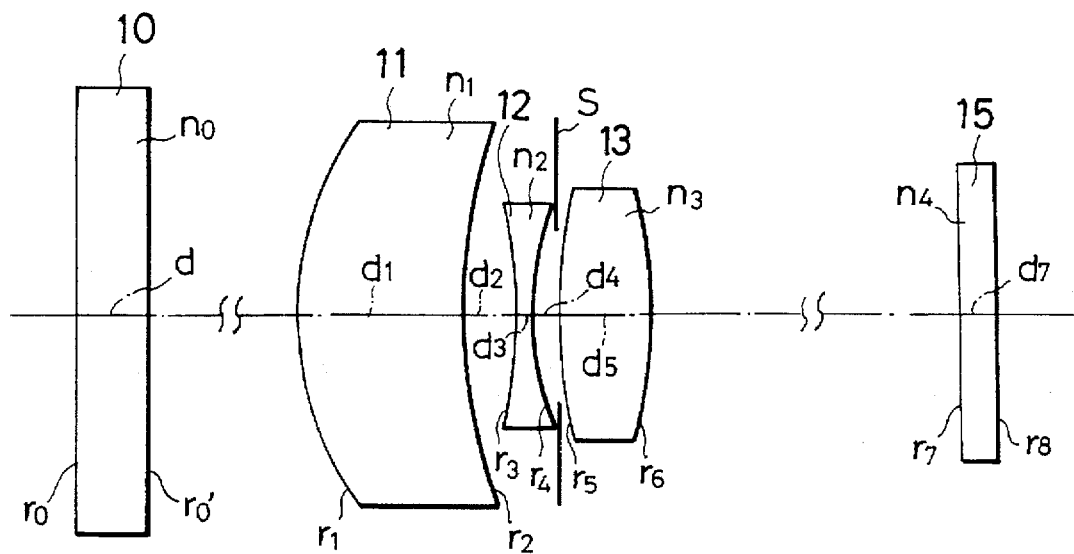
FIG. 20 is a view showing the construction of a lens for reading an original in accordance with an Embodiment 20 of the present invention.
Figure 21:
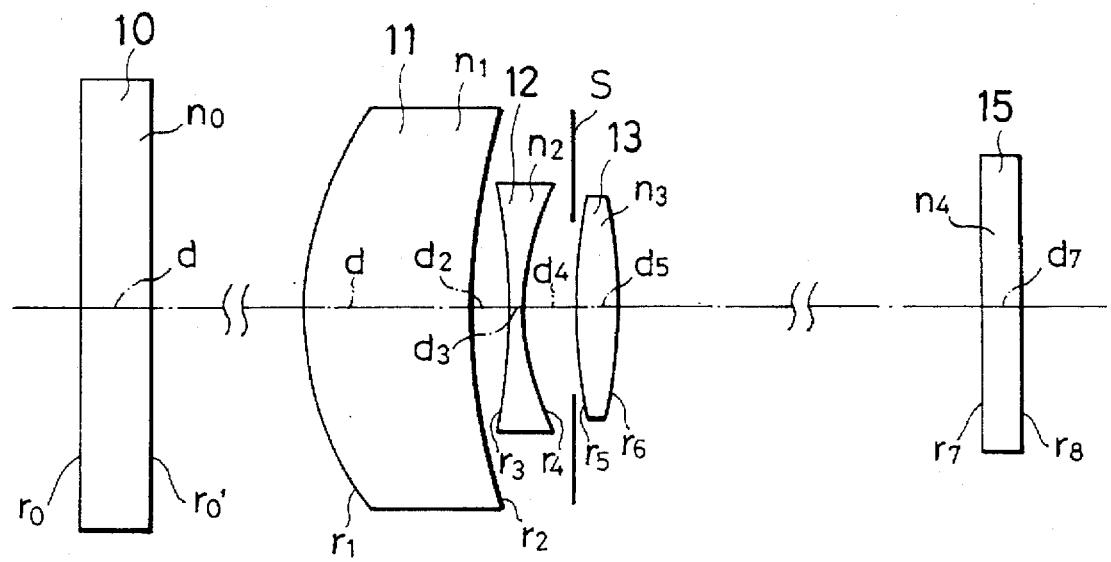
FIG. 21 is a view showing the construction of a lens for reading an original in accordance with an Embodiment 21 of the present invention.
Figure 22:
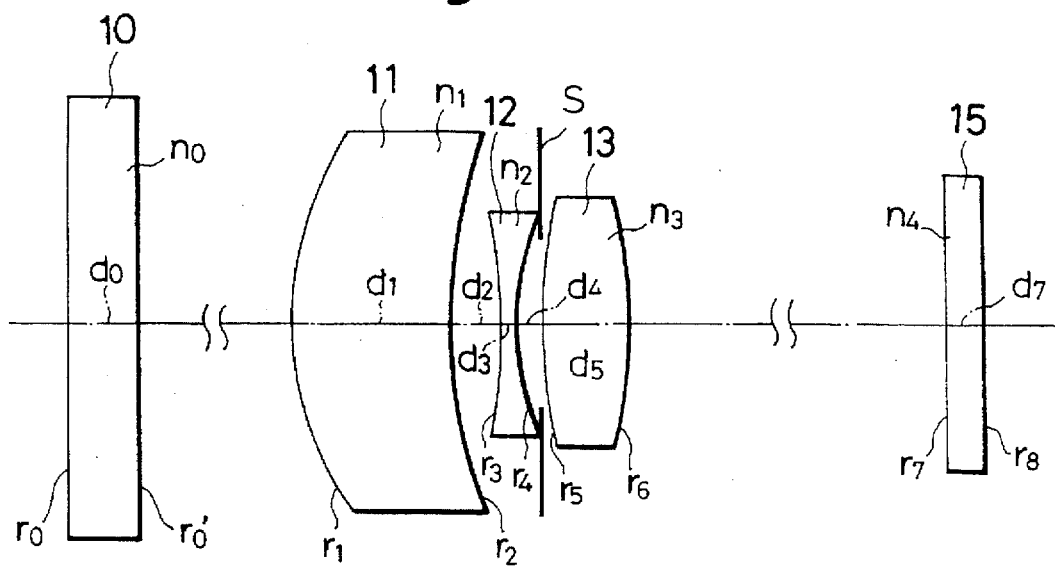
FIG. 22 is a view showing the construction of a lens for reading an original in accordance with an Embodiment 22 of the present invention.
Figure 23:
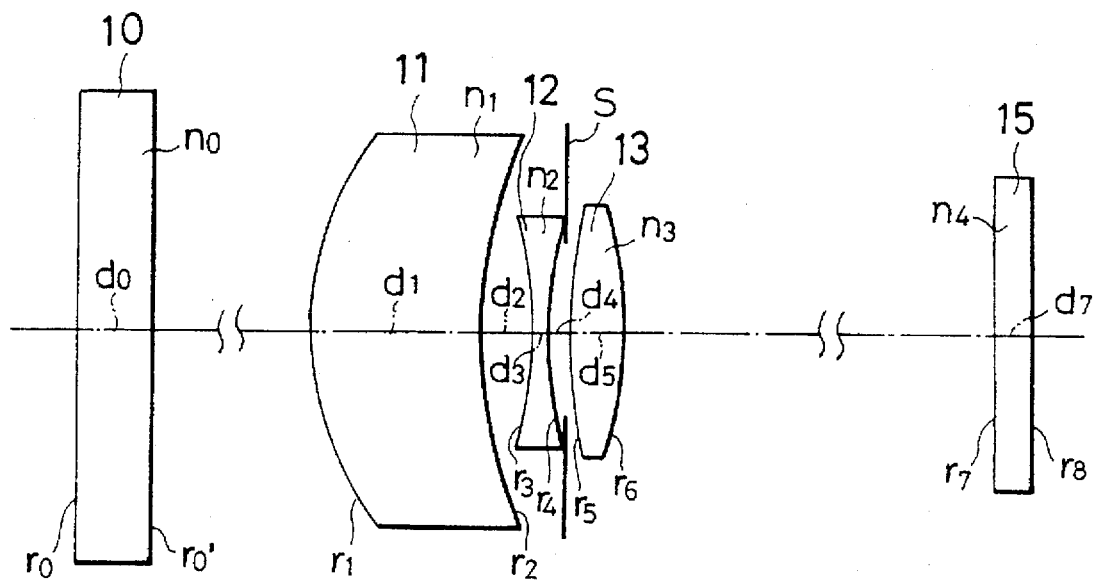
FIG. 23 is a view showing the construction of a lens for reading an original in accordance with an Embodiment 23 of the present invention.
Figure 24:
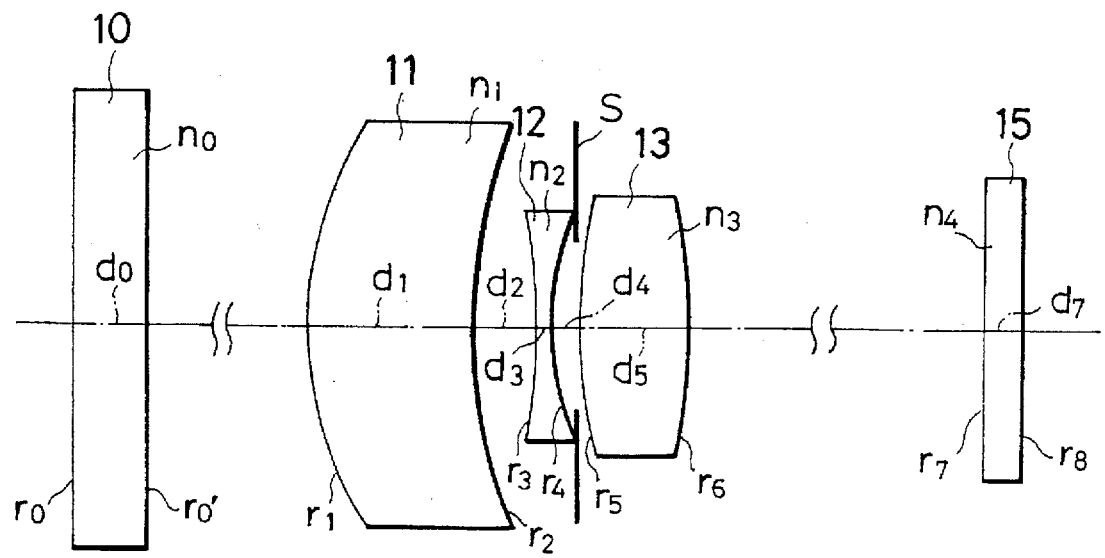
FIG. 24 is a view showing the construction of a lens for reading an original in accordance with an Embodiment 24 of the present invention.
Figure 25:
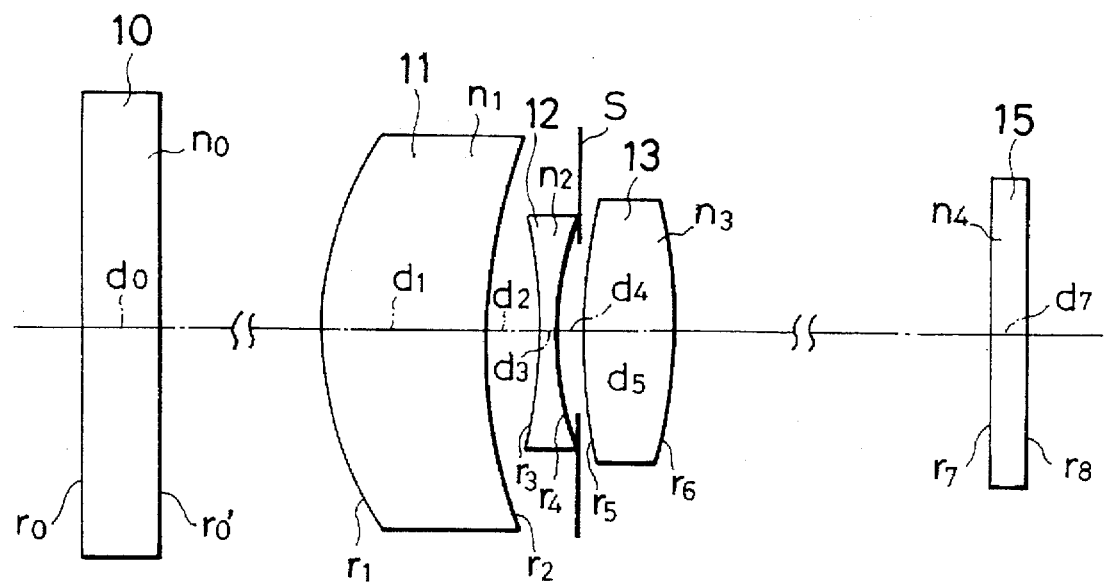
FIG. 25 is a view showing the construction of a lens for reading an original in accordance with an Embodiment 25 of the present invention.
Figures 37A, 37B, 37C:
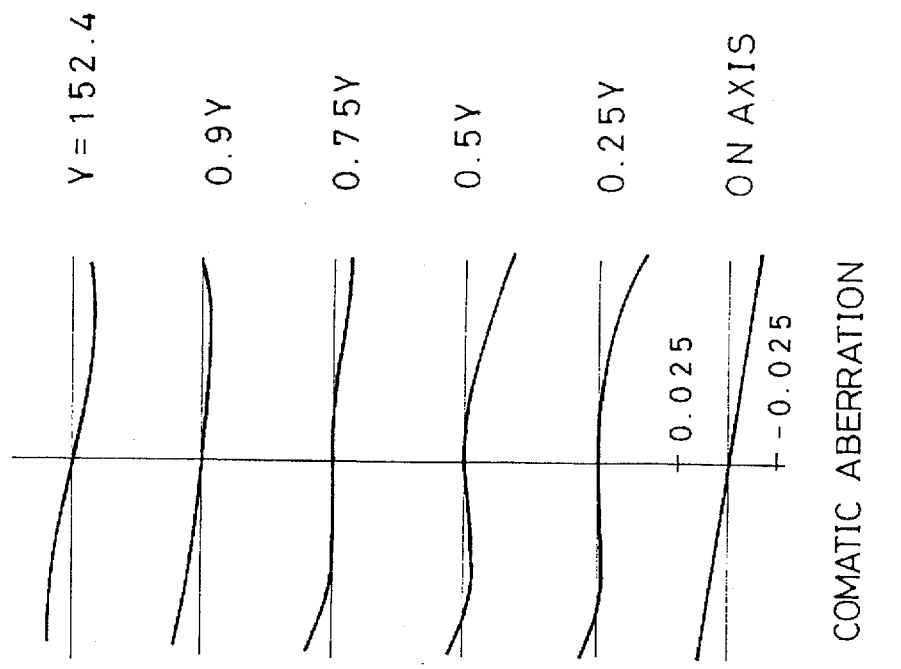
FIGS. 37a, 37b, 37c and 37d are respectively diagrams of spherical aberration, astigmatism, distortional aberration and comatic aberration of the original reading lens with respect to the Embodiment 12.
Figure 37D:
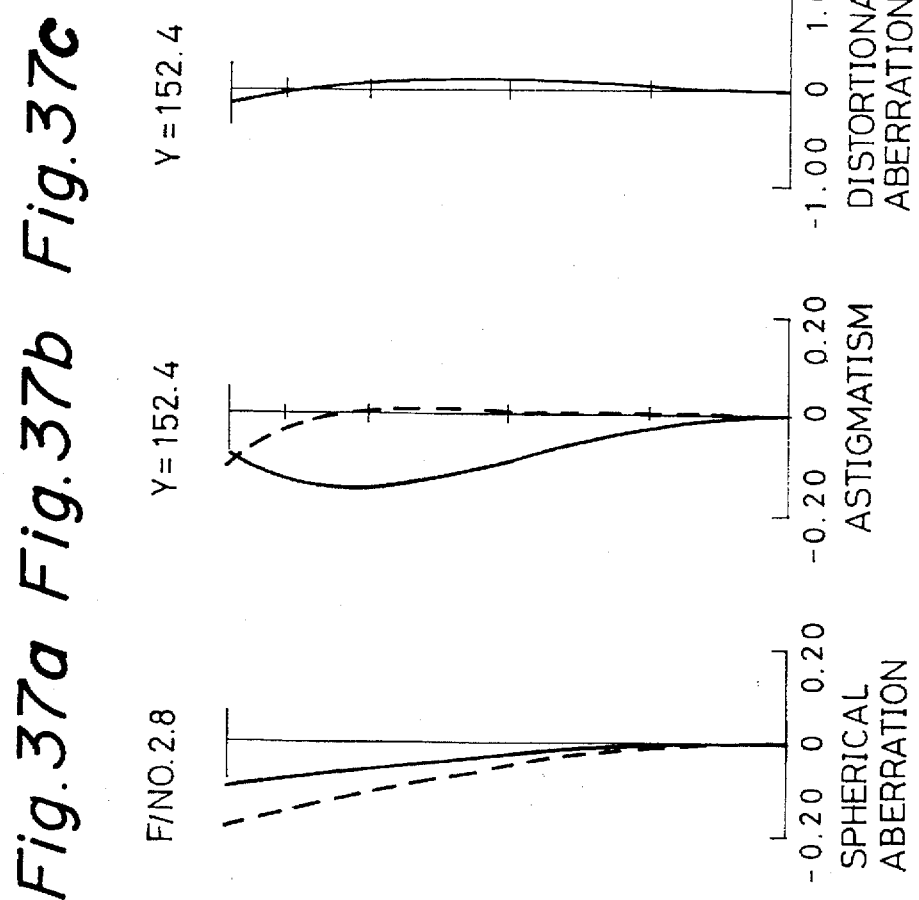
Figures 40A, 40B, 40C:
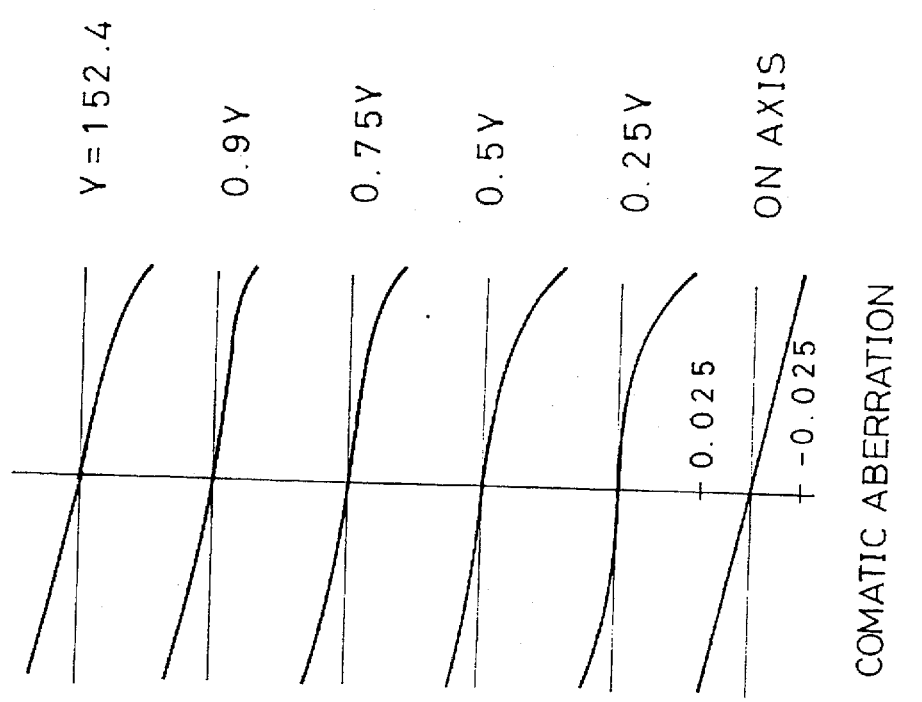
FIGS. 40a, 40b, 40c and 40d are respectively diagrams of spherical aberration, astigmatism, distortional aberration and comatic aberration of the original reading lens with respect to the Embodiment 15.
Figure 40D:
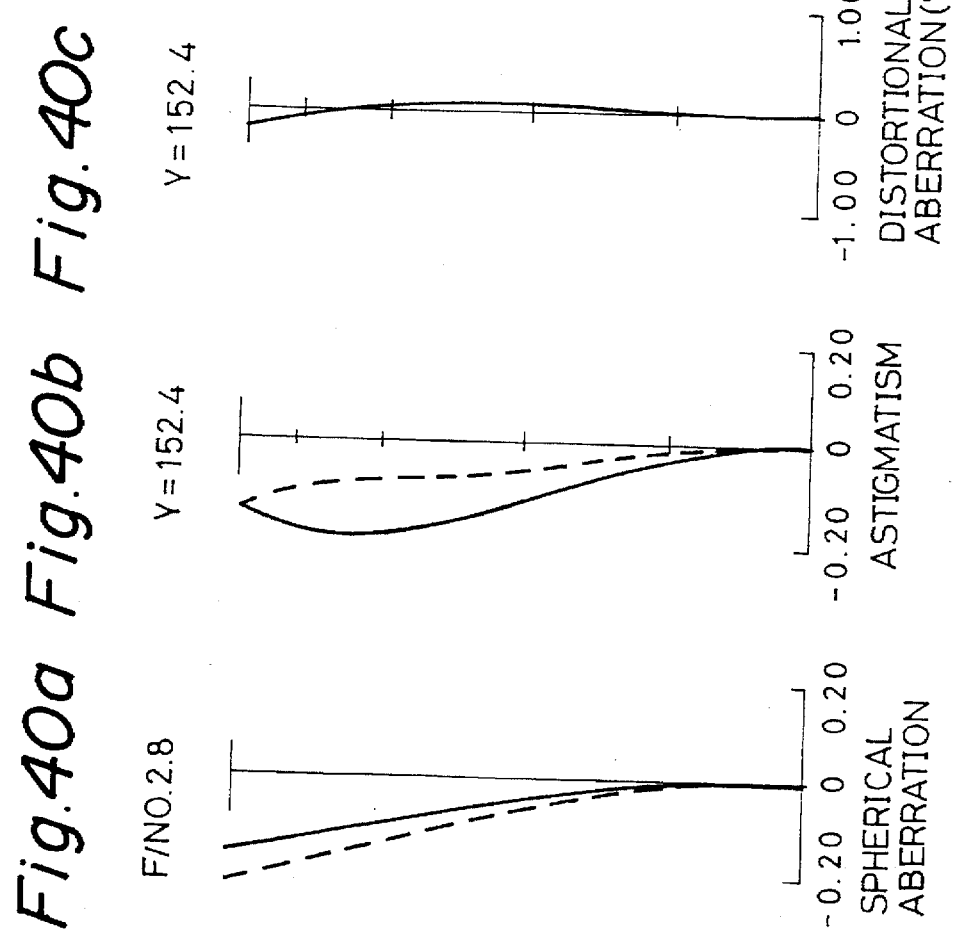

In each of fourth to thirty-fifth constructions of the present invention, for example, a lens system for reading an original has first to third lens groups sequentially arranged from an object side toward an image side as shown in FIG. 2.

A first lens 11 constitutes the first lens group and is constructed by a meniscus lens having a convex face on the object side.

A second lens 12 constitutes the second lens group and is constructed by a biconcave lens.

A third lens 13 constitutes the third lens group and is constructed by a biconvex lens.

Accordingly, the original reading lens system is constructed by three lenses in the three lens groups. In the fourth construction of the present invention, at least one of the first, second and third lenses is constructed by a refractive index distribution type lens.

In the fifth construction of the present invention, the second lens is constructed by a refractive index distribution type lens in the original reading lens having the fourth construction.

In the sixth construction of the present invention, the second lens is constructed by a refractive index distribution type lens of an axial type in the original reading lens having the fifth construction.

In the seventh construction of the present invention, the second lens is constructed by a refractive index distribution type lens of a radial type in the original reading lens having the fifth construction.

In the eighth construction of the present invention, the first lens is constructed of a refractive index distribution type lens in the original reading lens having the fourth construction.

In the ninth construction of the present invention, the first lens is constructed by a refractive index distribution type lens of an axial type in the original reading lens having the eighth construction.

In the tenth construction of the present invention, the first lens is constructed by a refractive index distribution type lens of a radial type in the original reading lens having the eighth construction.

In the eleventh construction of the present invention, the third lens is constructed by a refractive index distribution type lens in the original reading lens having the fourth construction.

In the twelfth construction of the present invention, the third lens is constructed by a refractive index distribution type lens of a radial type in the original reading lens having the eleventh construction.

In the thirteenth construction of the present invention, each of the first and third lenses is constructed by a refractive index distribution type lens in the original reading lens having the fourth construction.

In the fourteenth construction of the present invention, the first lens is constructed by a refractive index distribution type lens of a radial type in the original reading lens having the thirteenth construction. Further, the third lens is constructed by a refractive index distribution type lens of an axial type in the original reading lens having the thirteenth construction.

In the fifteenth construction of the present invention, each of the first and third lenses is constructed by a refractive index distribution type lens of a radial type in the original reading lens having the thirteenth construction.

In the sixteenth construction of the present invention, each of the first and third lenses is constructed by a refractive index distribution type lens of an axial type in the original reading lens having the thirteenth construction.

In the seventeenth construction of the present invention, the first lens is constructed by a refractive index distribution type lens of an axial type in the original reading lens having the thirteenth construction. Further, the third lens is constructed by a refractive index distribution type lens of a radial type in the original reading lens having the thirteenth construction.

In the eighteenth construction of the present invention, each of the first and second lenses is constructed by a refractive index distribution type lens in the original reading lens having the fourth construction.

In the nineteenth construction of the present invention, each of the first and second lenses is constructed by a refractive index distribution type lens of an axial type in the original reading lens having the eighteenth construction.

In the twentieth construction of the present invention, the first lens is constructed by a refractive index distribution type lens of an axial type in the original reading lens having the eighteenth construction. Further, the second lens is constructed by a refractive index distribution type lens of a radial type in the original reading lens having the eighteenth construction.

In the twenty-first construction of the present invention, the first lens is constructed by a refractive index distribution type lens of a radial type in the original reading lens having the eighteenth construction. Further, the second lens is constructed by a refractive index distribution type lens of an axial type in the original reading lens having the eighteenth construction.

In the twenty-second construction of the present invention, each of the first and second lenses is constructed by a refractive index distribution type lens of a radial type in the original reading lens having the eighteenth construction.

In the twenty-third construction of the present invention, each of the second and third lenses is constructed by a refractive index distribution type lens in the original reading lens having the fourth construction.

In the twenty-fourth construction of the present invention, each of the second and third lenses is constructed by a refractive index distribution type lens of an axial type in the original reading lens having the twenty-third construction.

In the twenty-fifth construction of the present invention, the second lens is constructed by a refractive index distribution type lens of an axial type in the original reading lens having the twenty-third construction. Further, the third lens is constructed by a refractive index distribution type lens of a radial type in the original reading lens having the twenty-third construction.

In the twenty-sixth construction of the present invention, the second lens is constructed by a refractive index distribution type lens of a radial type in the original reading lens having the twenty-third construction. Further, the third lens is constructed by a refractive index distribution type lens of an axial type in the original reading lens having the twenty-third construction.

In the twenty-seventh construction of the present invention, each of the second and third lenses is constructed by a refractive index distribution type lens of a radial type in the original reading lens having the twenty-third construction.

In the twenty-eighth construction of the present invention, each of the first, second and third lenses is constructed by a refractive index distribution type lens in the original reading lens having the fourth construction.

In the twenty-ninth construction of the present invention, each of the first, second and third lenses is constructed by a refractive index distribution type lens of an axial type in the original reading lens having the twenty-eighth construction.

In the thirtieth construction of the present invention, each of the first and second lenses is constructed by a refractive index distribution type lens of an axial type in the original reading lens having the twenty-eighth construction. Further, the third lens is constructed by a refractive index distribution type lens of a radial type in the original reading lens having the twenty-eighth construction.

In the thirty-first construction of the present invention, each of the first and third lenses is constructed by a refractive index distribution type lens of an axial type in the original reading lens having the twenty-eighth construction. Further, the second lens is constructed by a refractive index distribution type lens of a radial type in the original reading lens having the twenty-eighth construction.

In the thirty-second construction of the present invention, the first lens is constructed by a refractive index distribution type lens of an axial type in the original reading lens having the twenty-eighth construction. Further, each of the second and third lenses is constructed by a refractive index distribution type lens of a radial type in the original reading lens having the twenty-eighth construction.

In the thirty-third construction of the present invention, each of the first, second and third lenses is constructed by a refractive index distribution type lens of a radial type in the original reading lens having the twenty-eighth construction.

In the thirty-fourth construction of the present invention, each of the first and second lenses is constructed by a refractive index distribution type lens of a radial type in the original reading lens having the twenty-eighth construction. Further, the third lens is constructed by a refractive index distribution type lens of an axial type in the original reading lens having the twenty-eighth construction.

In the thirty-fifth construction of the present invention, each of the first and third lenses is constructed by a refractive index distribution type lens of a radial type in the original reading lens having the twenty-eighth construction. Further, the second lens is constructed by a refractive index distribution type lens of an axial type in the original reading lens having the twenty-eighth construction.

Various kinds of raw materials of the refractive index distribution type lens in the present invention are generally known as GRIN glass, GRIN monomer, etc., and are developed actively till now. There are various kinds of known methods for manufacturing the refractive index distribution type lens such as an ion exchange method, an electric field diffusive moving-implanting method, an ion stuffing method, a molecular stuffing method, a sol-gel method, an ion implanting method, etc.

As mentioned above, in each of the first to third constructions of the present invention, the first lens as the first lens group is constructed by the refractive index distribution type lens of a radial type.

The refractive index of the refractive index distribution type lens of the radial type is changed in accordance with a distance from the optical axis. Accordingly, a portion of refracting power of the refractive index distribution type lens of the radial type can contribute to a refractive index distribution as a partial charge. Therefore, it is possible to reduce a burden (as a partial charge) on the refractive index of the refractive index distribution type lens of the radial type on a lens face. Further, it is easy to correct a Petzval's sum with respect to the refractive index distribution type lens of the radial type.

Each of the second and third lenses as the second and third lens groups is constructed by the refractive index distribution type lens of an axial type.

The refractive index of the refractive index distribution type lens of the axial type is changed in an optical axis direction. Accordingly, this refractive index distribution type lens of the axial type is one lens, but has a function similar to a lens function provided by joining many lenses having different refractive indices to each other. Therefore, when such a lens is used, a degree of freedom with respect to an aberrational correction on a face of the refractive index distribution type lens is increased so that it is possible to preferably correct aberrations such as distortional, spherical and comatic aberrations, etc.

In the second construction of the present invention, the refractive index of a portion of the first lens is reduced as the first lens portion is separated from the optical axis. Accordingly, refracting power on each of lens faces is reduced as each of the lens faces is separated from the optical axis in comparison with a case in which the first lens is formed by a material having a uniform refractive index.

The refractive index of a portion of the second lens is reduced as this second lens portion is directed from an object side vertex toward an image side. Accordingly, refracting power on a concave face of the second lens on the object side is increased as this concave face is separated from the optical axis. In contrast to this, refracting power on a concave face of the second lens on the image side is decreased as this concave face is separated from the optical axis.

The refractive index of a portion of the third lens is increased as this third lens portion is directed from an object side vertex toward an image side. Accordingly, refracting power on a convex face of the third lens on the object side is increased as this convex face is separated from the optical axis. In contrast to this, refracting power on a concave face of the third lens on the image side is decreased as this concave face is separated from the optical axis.

In the third construction of the present invention, aberrations can be easily corrected by adjusting higher order distribution coefficients with respect to the refractive index distribution.

In each of the fourth to thirty-fifth constructions of the present invention, the first lens as the first lens group is constructed by a meniscus lens having a convex face on the object side in a basic construction. In this basic construction, the second lens as the second lens group is constructed by a biconcave lens and the third lens as the third lens group is constructed by a biconvex lens. Further, in this basic construction, one or more lenses of these three lenses are constructed by refractive index distribution type lenses.

In the original reading lens having each of the fifth to seventh constructions of the present invention, the second lens is constructed by the above refractive index distribution type lens of an axial or radial type so that preferable performance of the original reading lens can be realized.

In the original reading lens having each of the eighth to tenth constructions of the present invention, the first lens is constructed by the above refractive index distribution type lens of an axial or radial type so that preferable performance of the original reading lens can be realized.

In the original reading lens having each of the eleventh and twelfth constructions of the present invention, the third lens is constructed by the above refractive index distribution type lens of an axial or radial type so that preferable performance of the original reading lens can be realized.

In the original reading lens having each of the thirteenth to twenty-seventh constructions of the present invention, two lenses of the three lenses are constructed by refractive index distribution type lenses and the refractive index distribution type lenses are combined with each other and the axial and radial types are combined with each other so that more preferable performance of the original reading lens can be easily realized.

In the original reading lens having each of the twenty-eighth to thirty-fifth constructions of the present invention, each of the three lenses is constructed by a refractive index distribution type lens and the axial and radial types are combined with each other so that more preferable performance of the original reading lens can be easily realized.

Concrete embodiments of the present invention will next be described.

In all the concrete embodiments, "f" shows a combined focal length (unit: mm) of an entire lens system. "F/No" shows a brightness of the lens system. "m" shows a magnification of the lens system. "ω" shows a half field angle (unit: degree) of the lens system.

$r_0$ shows a radius of curvature of an object side face of a contact glass as an original arranging face. $r_0'$ shows a radius of curvature of an image side face of the contact glass. $d_0$ shows a thickness of the contact glass. $n_0$ shows a refractive index of the contact glass. $r_7$ shows a radius of curvature of an object side face of a cover glass of a charge coupled device (CCD) as a solid-state image sensor. $r_8$ shows a radius of curvature of an image side face of the cover glass. $d_7$ shows a thickness of the cover glass. $n_4$ shows a refractive index of the cover glass.

Further, in each of the respective embodiments, $r_i$ (i=1 to 6) shows a radius of curvature of an i-th lens face counted from the object side. $d_i$ (i=1 to 5) shows a distance on an optical axis of the lens system between the i-th lens face and a (i+1)-lens face counted from the object side. $n_j$ (j=1 to 3) shows a refractive index of a j-th lens counted from the object side.

In each of the following embodiments, concrete values of the refractive index and the focal length are provided on an "e-line".

A refractive index distribution of the refractive index distribution type lens is specified as follows.

In the following description, a vertex of the lens on the object side is equal to an intersecting point between the optical axis and the lens and is set to an origin. A coordinate x is set to be positive on an image side of the lens system. Further, $N_0$ is set to a refractive index of the lens in a position of the above origin and each of $N_1$, $N_2$ and $N_3$ is set to a refractive index distribution coefficient in this origin position. In this case, a refractive index distribution $n_j(x)$ of the refractive index distribution type lens of an axial type is represented by the following formula (1).

$$n_j(x)=N_0+N_1x+N_2x^2+N_3x^3 \quad (1)$$

Accordingly, the refractive index distribution $n_j(x)$ is specified by giving the refractive index $N_0$ and the refractive index distribution coefficients $N_1$, $N_2$ and $N_3$.

In the following description, a position of the optical axis is set to an origin and h ($\geqq 0$) is set to a distance coordinate from the optical axis. $N_{00}$ is set to a refractive index of the lens on the optical axis and each of $N_{10}$, $N_{20}$ and $N_{30}$ is set to a refractive index distribution coefficient on the optical axis. In this case, a refractive index distribution $n_j(h)$ of the refractive index distribution type lens of a radial type is represented by the following formula (2).

$$n_j(h)=N_{00}+N_{10}h^2+N_{20}h^4+N_{30}h^6 \quad (2)$$

Accordingly, the refractive index distribution $n_j(h)$ is specified by giving the refractive index $N_{00}$ and the refractive index distribution coefficients $N_{10}$, $N_{20}$ and $N_{30}$.

The above refractive index $n_j$ (j=1 to 3) gives the above $N_0$ in the refractive index distribution type lens of the axial type and gives the above $N_{00}$ in the refractive index distribution type lens of the radial type.

With respect to expressions of the refractive index distribution coefficients, E and a number subsequent to this alphabet E show a power of 10. For example, "E-2" means $10^{-2}$ and this power $10^{-2}$ is multiplied by a number before the alphabet E. Accordingly, for example, "0.1234E-2" means $0.1234/10^2$.

FIGS. 1 to 25 respectively show the construction of a lens for reading an original in accordance with the following Embodiments 1 to 25. In each of FIGS. 1 to 25, the object side as an original side is set to a left-hand side. Reference numeral 10 designates a contact glass. Reference numerals 11, 12 and 13 respectively designate first, second and third lenses. Reference numeral 15 designates a cover glass of a solid-state image sensor. Reference numeral S designates a diaphragm.

Embodiment 1
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 21.202 | $d_1$ | 11.000 | $n_1$ | $n_1$ (h) |
| $r_2$ | 43.056 | $d_2$ | 2.345 | | |
| $r_3$ | −36.929 | $d_3$ | 1.000 | $n_2$ | $n_2$ (x) |
| $r_4$ | 18.9 | $d_4$ | 2.357 | | |
| $r_5$ | 39.403 | $d_5$ | 5.255 | $n_3$ | $n_3$ (x) |
| $r_6$ | −34.303 | | | | |
| $r_7$ | ∞ | $d_7$ | 1.000 | $n_4$ | 1.51872 |
| $r_8$ | ∞ | | | | |

$n_1$ (h):
$N_{00} = 1.80000$, $N_{10} = -0.1182 \times 10^{-3}$,
$N_{20} = -0.4482 \times 10^{-7}$, $N_{30} = -0.6740 \times 10^{-9}$
$n_2$ (x):
$N_0 = 1.66621$, $N_1 = -0.1428 \times 10^{-3}$,
$N_2 = -0.2995 \times 10^{-2}$, $N_3 = -0.9252 \times 10^{-3}$
$n_3$ (x):
$N_0 = 1.80000$, $N_1 = 0.1425 \times 10^{-1}$,
$N_2 = 0.2947 \times 10^{-2}$, $N_3 = -0.5711 \times 10^{-4}$ Embodiment 2
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.484 | $d_1$ | 11.000 | $n_1$ | 1.88814 |
| $r_2$ | 34.185 | $d_2$ | 2.435 | | |
| $r_3$ | −37.542 | $d_3$ | 1.000 | $n_2$ | $n_2$ (x) |
| $r_4$ | 21.699 | $d_4$ | 2.427 | | |
| $r_5$ | 44.772 | $d_5$ | 5.294 | $n_3$ | 1.88814 |
| $r_6$ | −32.511 | | | | |
| $r_7$ | ∞ | $d_7$ | 1.000 | $n_4$ | 1.51872 |
| $r_8$ | ∞ | | | | |

$n_2$ (x):
$N_0 = 1.6208$, $N_1 = 0.8617E-1$,
$N_2 = 0.3892E-2$, $N_3 = -0.4202E-2$

Embodiment 3
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.387 | $d_1$ | 11.000 | $n_1$ | 1.88814 |
| $r_2$ | 30.358 | $d_2$ | 1.779 | | |
| $r_3$ | −35.951 | $d_3$ | 1.000 | $n_2$ | $n_2$ (h) |
| $r_4$ | 21.188 | $d_4$ | 1.737 | | |
| $r_5$ | 40.965 | $d_5$ | 6.310 | $n_3$ | 1.88814 |
| $r_6$ | −29.688 | | | | |
| $r_7$ | ∞ | $d_7$ | 1.000 | $n_4$ | 1.51872 |
| $r_8$ | ∞ | | | | |

$n_2$ (h):
$N_{00} = 1.664328$, $N_{10} = 0.5112E-2$,
$N_{20} = -0.3567E-5$, $N_{30} = 0.1551E-7$

Embodiment 4
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 26.082 | $d_1$ | 11.000 | $n_1$ | $n_1$ (x) |
| $r_2$ | 40.645 | $d_2$ | 5.997 | | |
| $r_3$ | −29.135 | $d_3$ | 1.000 | $n_2$ | 1.56355 |
| $r_4$ | 21.549 | $d_4$ | 2.414 | | |
| $r_5$ | 45.229 | $d_5$ | 3.125 | $n_3$ | 1.88814 |
| $r_6$ | −31.167 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.1664E-1$,
$N_2 = -0.1975E-3$, $N_3 = -0.6005E-4$

Embodiment 5
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 26.592 | $d_1$ | 11.000 | $n_1$ | $n_1$ (h) |
| $r_2$ | 40.933 | $d_2$ | 5.443 | | |
| $r_3$ | −40.112 | $d_3$ | 1.000 | $n_2$ | 1.597951 |
| $r_4$ | 20.3348 | $d_4$ | 2.599 | | |
| $r_5$ | 42.637 | $d_5$ | 5.509 | $n_3$ | 1.888141 |
| $r_6$ | −36.487 | | | | |
| $r_7$ | ∞ | $d_7$ | 1.000 | $n_4$ | 1.51872 |
| $r_8$ | ∞ | | | | |

$n_1$ (h):
$N_{00} = 1.80000$, $N_{10} = -0.3966E-3$,
$N_{20} = -0.3821E-6$, $N_{30} = -0.6843E-9$

Embodiment 6
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 21.862 | $d_1$ | 10.700 | $n_1$ | 1.88813 |
| $r_2$ | 38.208 | $d_2$ | 1.728 | | |
| $r_3$ | −29.181 | $d_3$ | 1.000 | $n_2$ | 1.69054 |

-continued

| | | | | | |
|---|---|---|---|---|---|
| $r_4$ | 20.750 | $d_4$ | 1.350 | | |
| $r_5$ | 2.893 | $d_5$ | 6.546 | $n_3$ | $n_3$ (h) |
| $r_6$ | −26.979 | | | | |
| $r_7$ | ∞ | $d_7$ | 1.000 | $n_4$ | 1.51872 |
| $r_8$ | ∞ | | | | |

$N_{00} = 1.80000$, $N_{10} = -0.4910E-3$,
$N_{20} = 0.1442E-5$, $N_{30} = -0.2424E-7$

Embodiment 7
$f = 43.0$ mm, F/No = 2.8, m = 0.1102, $\omega = 19°$

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 26.911 | $d_1$ | 9.937 | $n_1$ | $n_1$ (h) |
| $r_2$ | 39.831 | $d_2$ | 5.720 | | |
| $r_3$ | −43.670 | $d_3$ | 1.005 | $n_2$ | 1.57597 |
| $r_4$ | 19.591 | $d_4$ | 2.717 | | |
| $r_5$ | 39.744 | $d_5$ | 6.152 | $n_3$ | $n_3$ (x) |
| $r_6$ | −37.242 | | | | |
| $r_7$ | ∞ | $d_7$ | 1.000 | $n_4$ | 1.51872 |
| $r_8$ | ∞ | | | | |

$n_1$ (h):
$N_{00} = 1.93703$, $N_{10} = -0.3877E-3$,
$N_{20} = -0.3857E-6$, $N_{30} = -0.6903E-9$
$n_3$ (x):
$N_0 = 1.82116$, $N_1 = 0.6635E-3$,
$N_2 = 0.4984E-3$, $N_3 = -0.6527E-5$

Embodiment 8
$f = 43.0$ mm, F/No = 2.8, m = 0.1102, $\omega = 19°$

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 22.172 | $d_1$ | 11.000 | $n_1$ | $n_1$ (h) |
| $r_2$ | 30.157 | $d_2$ | 3.787 | | |
| $r_3$ | −25.502 | $d_3$ | 1.000 | $n_2$ | 1.52121 |
| $r_4$ | 20.163 | $d_4$ | 1.422 | | |
| $r_5$ | 34.412 | $d_5$ | 4.989 | $n_3$ | $n_3$ (h) |
| $r_6$ | −29.037 | | | | |
| $r_7$ | ∞ | $d_7$ | 1.000 | $n_4$ | 1.51872 |
| $r_8$ | ∞ | | | | |

$n_1$ (h):
$N_{00} = 1.80000$, $N_{10} = -0.981E-4$,
$N_{20} = 0.7613E-7$, $N_{30} = -0.5672E-10$
$n_3$ (h):
$N_{00} = 1.80000$, $N_{10} = -0.2405E-3$,
$N_{20} = -0.4165E-6$, $N_{30} = -0.1928E-7$

Embodiment 9
$f = 43.0$ mm, F/No = 2.8, m = 0.1102, $\omega = 19°$

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 21.507 | $d_1$ | 11.000 | $n_1$ | $n_1$ (x) |
| $r_2$ | 40.612 | $d_2$ | 2.288 | | |
| $r_3$ | −36.674 | $d_3$ | 1.000 | $n_2$ | 1.53253 |
| $r_4$ | 16.372 | $d_4$ | 3.720 | | |
| $r_5$ | 42.05 | $d_5$ | 2.847 | $n_3$ | $n_3$ (x) |
| $r_6$ | −27.472 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.1225E-1$,
$N_2 = 0.5632E-3$, $N_3 = -0.1368E-3$
$n_3$ (x):
$N_0 = 1.80000$, $N_1 = -0.7039E-1$,
$N_2 = -0.8829E-2$, $N_3 = 0.4059E-2$

Embodiment 10
$f = 43.0$ mm, F/No = 2.8, m = 0.1102, $\omega = 19°$

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.793 | $d_1$ | 10.000 | $n_1$ | $n_1$ (x) |
| $r_2$ | 35.423 | $d_2$ | 3.103 | | |
| $r_3$ | −31.983 | $d_3$ | 1.000 | $n_2$ | 1.62149 |
| $r_4$ | 18.737 | $d_4$ | 1.526 | | |
| $r_5$ | 35.924 | $d_5$ | 5.875 | $n_3$ | $n_3$ (h) |
| $r_6$ | −31.977 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.6078E-2$,
$N_2 = 0.5551E-3$, $N_3 = -0.4091E-4$
$n_3$ (h):
$N_{00} = 1.80000$, $N_{10} = -0.5158E-3$,
$N_{20} = -0.2122E-5$, $N_{30} = -0.3302E-7$

Embodiment 11
$f = 43.0$ mm, F/No = 2.8, m = 0.1102, $\omega = 19°$

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 21.203 | $d_1$ | 11.000 | $n_1$ | $n_1$ (x) |
| $r_2$ | 41.394 | $d_2$ | 2.792 | | |
| $r_3$ | −38.808 | $d_3$ | 1.000 | $n_2$ | $n_2$ (x) |
| $r_4$ | 19.984 | $d_4$ | 2.839 | | |
| $r_5$ | 46.539 | $d_5$ | 4.154 | $n_3$ | 1.88814 |
| $r_6$ | −33.022 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.8011E-2$,
$N_2 = 0.3990E-3$, $N_3 = -0.1056E-3$
$n_2$ (x):
$N_0 = 1.66013$, $N_1 = 0.3382E-1$,
$N_2 = -0.2585E-3$, $N_3 = -0.2363E-2$

Embodiment 12
$f = 43.0$ mm, F/No = 2.8, m = 0.1102, $\omega = 19°$

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 22.234 | $d_1$ | 11.000 | $n_1$ | $n_1$ (x) |
| $r_2$ | 40.415 | $d_2$ | 3.390 | | |
| $r_3$ | −36.922 | $d_3$ | 1.000 | $n_2$ | $n_2$ (h) |
| $r_4$ | 19.989 | $d_4$ | 2.710 | | |
| $r_5$ | 45.509 | $d_5$ | 4.407 | $n_3$ | 1.88814 |
| $r_6$ | −33.542 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.980E-2$,
$N_2 = 0.4268E-3$, $N_3 = -0.1140E-3$
$n_2$ (h):
$N_{00} = 1.63301$, $N_{10} = 0.1376E-3$,
$N_{20} = -0.1065E-5$, $N_{30} = -0.1157E-8$

Embodiment 13
$f = 43.0$ mm, F/No = 2.8, m = 0.1102, $\omega = 19°$

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.688 | $d_1$ | 11.000 | $n_1$ | $n_1$ (h) |
| $r_2$ | 34.482 | $d_2$ | 2.892 | | |
| $r_3$ | −36.760 | $d_3$ | 1.000 | $n_2$ | $n_2$ (x) |
| $r_4$ | 21.622 | $d_4$ | 2.57 | | |
| $r_5$ | 44.742 | $d_5$ | 4.533 | $n_3$ | 1.88814 |
| $r_6$ | −33.440 | | | | |
| $r_7$ | ∞ | $d_7$ | 1.000 | $n_4$ | 1.51872 |
| $r_8$ | ∞ | | | | |

$n_1$ (h):
$N_{00} = 1.80000$, $N_{10} = -0.1491E-3$,
$N_{20} = -0.233E-6$, $N_{30} = -0.1302E-8$
$n_2$ (x):
$N_0 = 1.60856$, $N_1 = 0.8327E-1$,
$N_2 = 0.2878E-2$, $N_3 = -0.4100E-2$

Embodiment 14
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 21.986 | $d_1$ | 11.000 | $n_1$ | $n_1$ (h) |
| $r_2$ | 34.802 | $d_2$ | 3.465 | | |
| $r_3$ | −34.056 | $d_3$ | 1.000 | $n_2$ | $n_2$ (h) |
| $r_4$ | 21.692 | $d_4$ | 2.290 | | |
| $r_5$ | 44.561 | $d_5$ | 4.512 | $n_3$ | 1.88814 |
| $r_6$ | −30.848 | | | | |
| $r_7$ | ∞ | $d_7$ | 1.000 | $n_4$ | 1.51872 |
| $r_8$ | ∞ | | | | |

$n_1$ (h):
$N_{00} = 1.80000$, $N_{10} = -0.1893E-3$,
$N_{20} = -0.2441E-6$, $N_{30} = -0.1113E-8$
$n_2$ (h):
$N_{00} = 1.63943$, $N_{10} = 0.3191E-3$,
$N_{20} = -0.1717E-5$, $N_{30} = 0.2174E-8$

Embodiment 15
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.239 | $d_1$ | 10.000 | $n_1$ | 1.88814 |
| $r_2$ | 34.521 | $d_2$ | 2.860 | | |
| $r_3$ | −36.835 | $d_3$ | 1.000 | $n_2$ | $n_2$ (x) |
| $r_4$ | 21.214 | $d_4$ | 2.346 | | |
| $r_5$ | 41.710 | $d_5$ | 5.198 | $n_3$ | $n_3$ (x) |
| $r_6$ | −34.498 | | | | |
| $r_7$ | ∞ | $d_7$ | 1.000 | $n_4$ | 1.51872 |
| $r_8$ | ∞ | | | | |

$n_2$ (x):
$N_0 = 1.61312$, $N_1 = -0.8235E-1$,
$N_2 = 0.2007E-2$, $N_3 = -0.4067E-2$
$n_3$ (x):
$N_0 = 1.80000$, $N_1 = 0.3314E-1$,
$N_2 = 0.1775E-2$, $N_3 = -0.4221E-3$

Embodiment 16
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.627 | $d_1$ | 11.000 | $n_1$ | 1.88814 |
| $r_2$ | 29.901 | $d_2$ | 2.560 | | |
| $r_3$ | −37.273 | $d_3$ | 1.000 | $n_2$ | $n_2$ (x) |
| $r_4$ | 21.535 | $d_4$ | 1.417 | | |
| $r_5$ | 40.346 | $d_5$ | 7.580 | $n_3$ | $n_3$ (h) |
| $r_6$ | −36.140 | | | | |
| $r_7$ | ∞ | $d_7$ | 1.000 | $n_4$ | 1.51872 |
| $r_8$ | ∞ | | | | |

$n_2$ (x):
$N_0 = 1.60100$, $N_1 = 0.9946E-1$,
$N_2 = 0.5119E-3$, $N_3 = -0.1035E-2$
$n_3$ (h):
$N_{00} = 1.80000$, $N_{10} = -0.6203E-3$,
$N_{20} = -0.2554E-5$, $N_{30} = -0.1793E-7$

Embodiment 17
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.411 | $d_1$ | 11.000 | $n_1$ | 1.88814 |
| $r_2$ | 29.193 | $d_2$ | 2.008 | | |
| $r_3$ | −34.916 | $d_3$ | 1.000 | $n_2$ | $n_2$ (h) |
| $r_4$ | 21.648 | $d_4$ | 1.708 | | |
| $r_5$ | 39.862 | $d_5$ | 5.967 | $n_3$ | $n_3$ (x) |
| $r_6$ | −29.839 | | | | |
| $r_7$ | ∞ | $d_7$ | 1.000 | $n_4$ | 1.51872 |
| $r_8$ | ∞ | | | | |

$n_2$ (h):
$N_{00} = 1.64086$, $N_{10} = 0.6528E-3$,
$N_{20} = -0.3710E-5$, $N_{30} = 0.1498E-7$ $n_3$ (x):
$N_0 = 1.80000$, $N_1 = 0.3058E-1$,
$N_2 = 0.1633E-2$, $N_3 = -0.5156E-3$

Embodiment 18
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.121 | $d_1$ | 11.000 | $n_1$ | 1.88814 |
| $r_2$ | 26.541 | $d_2$ | 1.810 | | |
| $r_3$ | −34.067 | $d_3$ | 1.000 | $n_2$ | $n_2$ (h) |
| $r_4$ | 22.863 | $d_4$ | 1.280 | | |
| $r_5$ | 37.043 | $d_5$ | 6.767 | $n_3$ | $n_3$ (h) |
| $r_6$ | −30.691 | | | | |
| $r_7$ | ∞ | $d_7$ | 1.000 | $n_4$ | 1.51872 |
| $r_8$ | ∞ | | | | |

$n_2$ (h):
$N_{00} = 1.69977$, $N_{10} = 0.5017E-3$,
$N_{20} = -0.3733E-5$, $N_{30} = 0.1197E-7$
$n_3$ (h):
$N_{00} = 1.80000$, $N_{10} = -0.6347E-3$,
$N_{20} = -0.2472E-5$, $N_{30} = -0.1053E-7$

Embodiment 19
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 21.398 | $d_1$ | 11.000 | $n_1$ | $n_1$ (x) |
| $r_2$ | 39.476 | $d_2$ | 2.729 | | |
| $r_3$ | −39.374 | $d_3$ | 1.000 | $n_2$ | $n_2$ (x) |
| $r_4$ | 19.786 | $d_4$ | 2.157 | | |
| $r_5$ | 40.262 | $d_5$ | 5.881 | $n_3$ | $n_3$ (x) |
| $r_6$ | −38.913 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.7881E-2$,
$N_2 = 0.4511E-3$, $N_3 = -0.1036E-3$
$n_2$ (x):
$N_0 = 1.6413$, $N_1 = 0.3317E-1$,
$N_2 = -0.1687E-2$, $N_3 = 0.2115E-2$
$n_3$ (x):
$N_0 = 1.80000$, $N_1 = 0.3724E-1$,
$N_2 = 0.2635E-2$, $N_3 = -0.3352E-3$

Embodiment 20
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 22.163 | $d_1$ | 11.000 | $n_1$ | $n_1$ (x) |
| $r_2$ | 37.716 | $d_2$ | 3.450 | | |
| $r_3$ | −33.616 | $d_3$ | 1.000 | $n_2$ | $n_2$ (x) |
| $r_4$ | 19.854 | $d_4$ | 1.609 | | |
| $r_5$ | 39.788 | $d_5$ | 5.966 | $n_3$ | $n_3$ (h) |
| $r_6$ | −34.915 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.8101E-2$,
$N_2 = 0.4343E-3$, $N_3 = -0.6413E-4$
$n_2$ (x):
$N_0 = 1.61992$, $N_1 = 0.1393E-1$,
$N_2 = -0.2769E-2$
$n_3$ (h):
$N_{00} = 1.80000$, $N_{10} = 0.6521E-3$,
$N_{20} = -0.2624E-5$, $N_{30} = -0.2624E-7$

Embodiment 21
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 22.211 | $d_1$ | 10.890 | $n_1$ | $n_1$(x) |
| $r_2$ | 39.252 | $d_2$ | 2.656 | | |
| $r_3$ | −38.613 | $d_3$ | 1.000 | $n_2$ | $n_2$ (h) |

-continued

| | | | | | |
|---|---|---|---|---|---|
| $r_4$ | 16.665 | $d_4$ | 3.369 | | |
| $r_5$ | 43.526 | $d_5$ | 2.777 | $n_3$ | $n_3$ (x) |
| $r_6$ | −29.741 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.1510E-1$,
$N_2 = 0.3256E-3$, $N_3 = -0.1495E-3$
$n_2$ (h):
$N_{00} = 1.53084$, $N_{10} = 0.2968E-4$,
$N_{20} = -0.7035E-6$, $N_{30} = 0.2717E-8$
$n_3$ (x):
$N_0 = 1.80000$, $N_1 = -0.4851E-1$,
$N_2 = -0.1552E-1$, $N_3 = 0.5061E-2$

Embodiment 22
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 22.013 | $d_1$ | 11.000 | $n_1$ | $n_1$ (x) |
| $r_2$ | 37.855 | $d_2$ | 3.376 | | |
| $r_3$ | −32.734 | $d_3$ | 1.000 | $n_2$ | $n_2$ (h) |
| $r_4$ | 19.831 | $d_4$ | 1.596 | | |
| $r_5$ | 39.123 | $d_5$ | 5.844 | $n_3$ | $n_3$ (h) |
| $r_6$ | −34.311 | | | | |
| $r_7$ | ∞ | $d_7$ | 1.000 | $n_4$ | 1.51872 |
| $r_8$ | ∞ | | | | |

$n_1$ (x):
$N_0 = 1.80000$, $N_1 = -0.7550E-2$,
$N_2 = 0.5579E-3$, $N_3 = -0.6553E-4$
$n_2$ (h):
$N_{00} = 1.62532$, $N_{10} = -0.6510E-5$,
$N_{20} = -0.2164E-6$, $N_{30} = -0.2920E-8$
$n_3$ (h):
$N_{00} = 1.80000$, $N_{10} = -0.6374E-3$,
$N_{20} = -0.2453E-5$, $N_{30} = -0.2525E-7$

Embodiment 23
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 20.256 | $d_1$ | 11.000 | $n_1$ | $n_1$ (h) |
| $r_2$ | 26.512 | $d_2$ | 3.547 | | |
| $r_3$ | −21.50 | $d_3$ | 1.000 | $n_2$ | $n_2$ (h) |
| $r_4$ | 24.752 | $d_4$ | 1.039 | | |
| $r_5$ | 36.213 | $d_5$ | 3.436 | $n_3$ | $n_3$ (h) |
| $r_6$ | −25.106 | | | | |
| $r_7$ | ∞ | $d_7$ | 1.000 | $n_4$ | 1.51872 |
| $r_8$ | ∞ | | | | |

$n_1$ (h):
$N_{00} = 1.80000$, $N_{10} = 0.1011E-4$,
$N_{20} = 0.2623E-6$, $N_{30} = -0.7388E-10$
$n_2$ (h):
$N_{00} = 1.56390$, $N_{10} = 0.6639E-4$,
$N_{20} = -0.8444E-6$, $N_{30} = -0.8426E-8$
$n_3$ (h):
$N_{00} = 1.80000$, $N_{10} = -0.4149E-3$,
$N_{20} = -0.9350E-6$, $N_{30} = -0.4528E-8$

Embodiment 24
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 23.383 | $d_1$ | 11.000 | $n_1$ | $n_1$ (h) |
| $r_2$ | 34.391 | $d_2$ | 4.057 | | |
| $r_3$ | −38.076 | $d_3$ | 1.000 | $n_2$ | $n_2$ (h) |
| $r_4$ | 21.178 | $d_4$ | 1.623 | | |
| $r_5$ | 37.974 | $d_5$ | 6.939 | $n_3$ | $n_3$ (x) |
| $r_6$ | −39.900 | | | | |
| $r_7$ | ∞ | $d_7$ | 1.000 | $n_4$ | 1.51872 |
| $r_8$ | ∞ | | | | |

$n_1$ (h):
$N_{00} = 1.80000$, $N_{10} = -0.2653E-3$,
$N_{20} = -0.3286E-6$, $N_{30} = -0.1074E-8$
$n_2$ (h):
$N_{00} = 1.66621$, $N_{10} = 0.2731E-3$,
$N_{20} = -0.1240E-5$, $N_{30} = -0.1296E-8$
$n_1$ (x):
$N_0 = 1.80000$, $N_1 = 0.4109E-1$,
$N_2 = 0.3674E-2$, $N_3 = -0.4884E-3$

Embodiment 25
f = 43.0 mm, F/No = 2.8, m = 0.1102, ω = 19°

| | | | | | |
|---|---|---|---|---|---|
| $r_0$ | ∞ | $d_0$ | 3.000 | $n_0$ | 1.51872 |
| $r_0'$ | ∞ | | | | |
| $r_1$ | 21.509 | $d_1$ | 11.000 | $n_1$ | $n_1$ (h) |
| $r_2$ | 36.465 | $d_2$ | 3.310 | | |
| $r_3$ | −32.614 | $d_3$ | 1.000 | $n_2$ | $n_2$ (x) |
| $r_4$ | 19.924 | $d_4$ | 1.525 | | |
| $r_5$ | 38.815 | $d_5$ | 5.938 | $n_3$ | $n_3$ (h) |
| $r_6$ | −34.273 | | | | |
| $r_7$ | ∞ | $d_7$ | 1.000 | $n_4$ | 1.51872 |
| $r_8$ | ∞ | | | | |

$n_1$ (h):
$N_{00} = 1.80000$, $N_{10} = -0.5966E-4$,
$N_{20} = 0.8408E-7$, $N_{30} = -0.2663E-9$
$n_2$ (x):
$N_0 = 1.61532$, $N_1 = 0.8284E-2$,
$N_2 = -0.8915E-3$, $N_3 = -0.3985E-3$
$n_3$ (h):
$N_{00} = 1.80000$, $N_{10} = -0.6446E-3$,
$N_{20} = -0.2496E-5$, $N_{30} = -0.2608E-7$

FIGS. 26 to 50 are respectively diagrams of spherical aberration, astigmatism, distortional aberration and comatic aberration of the original reading lens with respect to the Embodiments 1 to 25. In each of FIGS. 26a to 50a showing the spherical aberration, the spherical aberration is shown by a solid line and a sine condition is shown by a broken line. In each of FIGS. 26b to 50b showing the astigmatism, a sagittal image surface is shown by a solid line and a meridional image surface is shown by a broken line. Further, in each of FIGS. 26b to 50b showing the astigmatism, Y shows an object height.

In each of the embodiments, the aberrations are preferably corrected and the comatic aberration is also corrected. From these embodiments, it should be understood that high contrast of an image can be obtained at a high spatial frequency on an image face. The distortional aberration is also corrected so that an original image can be extremely read preferably without distortion. A half field angle is equal to 19 degrees so that the field angle is wide. A vignetting factor is approximately equal to 100% until a peripheral portion of the lens. Further, F/No is equal to 2.8 so that the lens is very bright.

As mentioned above, in accordance with a novel lens for reading an original in the present invention, the number of constructional lenses is reduced and set to three so that the original reading lens can be made compact. Further, one lens or more of the three constructional lenses are constructed by refractive index distribution type lenses in each of first to thirty-fifth constructions of the present invention. Accordingly, a degree of freedom in lens design is large and preferable performance of the original reading lens can be easily realized.

In each of the fifth to twelfth constructions of the present invention, a refractive index distribution type lens is used as one lens of the original reading lens so that preferable performance of the original reading lens can be realized.

In each of the thirteenth to twenty-seventh constructions of the present invention, each of two lenses of the three constructions lenses of the original reading lens is constructed by a refractive index distribution type lens. More preferable performance of the original reading lens can be realized by combining the refractive index distribution type lenses with each other and combining axial and radial types with each other.

In each of the first to third constructions and each of the twenty-eighth to thirty-fifth constructions of the present invention, each of the three constructional lenses of the original reading lens is constructed by a refractive index distribution type lens and the axial and radial types are combined with each other so that more preferable performance of the original reading lens can be easily realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lens system for reading an image comprising:

first to third lens groups sequentially arranged from an object side toward an image side;

the first lens group including a first positive meniscus lens having a convex face on the object side;

the second lens group including a second biconcave lens;

the third lens group including a third biconvex lens;

said first lens including a refractive index distribution type lens having a refractive index changed in a direction perpendicular to an optical axis of the original reading lens; and each of said second and third lenses including a refractive index distribution type lens having a refractive index changed in a direction of the optical axis;

wherein the refractive index of a portion of the first lens is reduced as this first lens portion is separated from the optical axis;

the refractive index of a portion of the second lens is reduced as this second lens portion is directed from a vertex on the object side toward the image side; and the refractive index of a portion of the third lens is increased as this third lens portion is directed from a vertex on the object side toward the image side; and wherein a refractive index distribution of the refractive index distribution type lens having the refractive index changed in the direction perpendicular to the optical axis is represented by $$n(h)=N_{00}+N_{10}h^2+N_{20}h^4+N_{20}h^6$$

when $N_{00}$ is set to a refractive index of this lens on the optical axis, h is set to a distance from the optical axis, and $N_{10}$, $N_{20}$ and $N_{30}$ are set to higher order distribution coefficients;

a refractive index distribution of the refractive index distribution type lens having the refractive index changed in the optical axis direction is represented by $$n(x)=N_0+N_1x+N_2x^2+N_3x^3$$

when $N_0$ is set to a refractive index of this lens at the object side vertex x is set to a distance from the object side vertex, and $N_1$. $N_2$ and $N_3$ are set to higher order distribution coefficients;

$N_{10}<0$, $N_{20}<0$, and $N_{30}<0$ are set with respect to the first refractive index distribution type lens having the refractive index changed in the direction perpendicular to the optical axis;

$N_1<0$, $N_2<0$, and $N_3<0$ are set with respect to the second refractive index distribution type lens having the refractive index changed in the optical axis direction; and $N_1>0$, $N_2>0$, and $N_3<0$ are set with respect to the third refractive index distribution type lens having the refractive index changed in the optical axis direction.

2. A lens system for reading an image by reducing a size of the original image and forming an image on the plane of image formation, in which a distance from a plane of the image to a plane of image formation is finite comprising:

first to third lens elements sequentially arranged from an object side toward an image;

the first lens element including a first meniscus lens having a convex face on the object side;

the second lens element including a second biconcave lens;

the third lens element including a third biconvex lens; and at least one of said first, second and third including a refractive index distribution type lens;

wherein a magnification of the lens system is 0.1102.

3. A lens system for reading an image as claimed in claim 2, wherein the lens is single focus.

* * * * *